United States Patent
Ely

(10) Patent No.: US 11,316,905 B2
(45) Date of Patent: *Apr. 26, 2022

(54) SYSTEMS AND METHODS FOR PROVIDING NETWORK SECURITY USING A SECURE DIGITAL DEVICE

(71) Applicant: CUPP Computing AS, Oslo (NO)

(72) Inventor: Omar Nathaniel Ely, Paris (FR)

(73) Assignee: CUPP Computing AS, Oslo (NO)

( * ) Notice: Subject to any disclaimer, the term of this patent is extended or adjusted under 35 U.S.C. 154(b) by 0 days.

This patent is subject to a terminal disclaimer.

(21) Appl. No.: 16/883,785

(22) Filed: May 26, 2020

(65) Prior Publication Data

US 2021/0120040 A1    Apr. 22, 2021

Related U.S. Application Data

(63) Continuation of application No. 16/299,087, filed on Mar. 11, 2019, now Pat. No. 10,666,688, which is a
(Continued)

(51) Int. Cl.
    *H04L 29/06*    (2006.01)
(52) U.S. Cl.
    CPC .............. *H04L 63/20* (2013.01); *H04L 63/14* (2013.01)
(58) Field of Classification Search
    CPC ................................ H04L 63/20; H04L 63/14
(Continued)

(56) References Cited

U.S. PATENT DOCUMENTS

| H1944 H | 2/2001 | Cheswick |
|---|---|---|
| 6,286,087 B1 | 9/2001 | Ito |

(Continued)

FOREIGN PATENT DOCUMENTS

| WO | 2000078008 | 12/2000 |
|---|---|---|
| WO | 2004030308 | 4/2004 |

(Continued)

OTHER PUBLICATIONS

Breeden II, John et al., "A Hardware Firewall You Take With You," Government Computer News, located at http:/gcn.com/Articles/2005/06/01/A-hardware-firewall-you-take-with-you.aspx?p=1, Jun. 1, 2005.

(Continued)

*Primary Examiner* — Kambiz Zand
*Assistant Examiner* — Aubrey H Wyszynski
(74) *Attorney, Agent, or Firm* — Sheppard, Mullin, Richter & Hampton LLP

(57) ABSTRACT

A system may include a traffic interception module configured to intercept network traffic of a host device. A traffic virtualization module may be configured to generate a virtual file on the host device containing the intercepted network traffic. A security system interface module may be configured to provide the virtual file to a secure digital security system over a virtualized file interface coupling the host device to the secure digital security system, and to receive instructions to allow or to deny the network traffic from the secure digital security system over the virtualized file interface. A traffic access management module may be configured to allow or to deny the network traffic based on the instructions.

24 Claims, 12 Drawing Sheets

Related U.S. Application Data continuation of application No. 15/701,365, filed on Sep. 11, 2017, now Pat. No. 10,291,656, which is a continuation of application No. 14/622,764, filed on Feb. 13, 2015, now Pat. No. 9,762,614.

(60) Provisional application No. 61/943,364, filed on Feb. 22, 2014, provisional application No. 61/939,644, filed on Feb. 13, 2014.

(58) Field of Classification Search
USPC .......................................................... 726/1
See application file for complete search history.

(56) References Cited

U.S. PATENT DOCUMENTS

| | | |
|---|---|---|
| 6,466,779 B1 | 10/2002 | Moles |
| 6,725,294 B1 | 4/2004 | Moore et al. |
| 6,772,345 B1 | 8/2004 | Shetty |
| 6,813,682 B2 | 11/2004 | Bress |
| 7,036,143 B1 | 4/2006 | Leung |
| 7,065,644 B2 | 6/2006 | Daniell |
| 7,069,330 B1 | 6/2006 | McArdle |
| 7,076,690 B1 | 7/2006 | Todd |
| 7,086,089 B2 | 8/2006 | Hrastar |
| 7,131,141 B1 | 10/2006 | Blewett |
| 7,168,089 B2 | 1/2007 | Nguyen |
| D537,036 S | 2/2007 | Chen |
| 7,184,554 B2 | 2/2007 | Freese |
| 7,197,638 B1 | 3/2007 | Grawrock |
| 7,283,542 B2 | 10/2007 | Mitchell |
| 7,353,533 B2 | 4/2008 | Wright |
| 7,359,983 B1 | 4/2008 | Maufer |
| 7,360,242 B2 | 4/2008 | Syvanne |
| 7,418,253 B2 | 8/2008 | Kavanagh |
| 7,529,932 B1 | 5/2009 | Haustein |
| 7,539,828 B2 | 5/2009 | Lomnes |
| 7,657,941 B1 | 2/2010 | Zaitsev |
| 7,665,137 B1 | 2/2010 | Barton |
| 7,818,803 B2 | 10/2010 | Gordon |
| 7,894,480 B1 | 2/2011 | Wang et al. |
| 7,908,476 B2 | 3/2011 | Kandasamy |
| 7,971,258 B1 | 6/2011 | Liao et al. |
| 7,984,479 B2 | 7/2011 | Brabson |
| 7,992,199 B1 | 8/2011 | Winick |
| 8,180,654 B2 | 5/2012 | Berkman |
| 8,218,449 B2 | 7/2012 | Taylor |
| 8,218,558 B2 | 7/2012 | Tan |
| 8,234,261 B2 | 7/2012 | Monahan |
| 8,239,531 B1 | 8/2012 | Bellovin |
| 8,266,670 B1 | 9/2012 | Merkow |
| 8,321,934 B1 | 11/2012 | Cooley |
| 8,402,528 B1 | 3/2013 | McCorkendale |
| 8,495,290 B2 | 7/2013 | Sugar et al. |
| 8,495,700 B2 | 7/2013 | Shahbazi |
| 8,631,488 B2 | 1/2014 | Oz |
| RE45,009 E | 7/2014 | Vange et al. |
| 8,904,523 B2 | 12/2014 | Gordon |
| 8,978,132 B2 | 3/2015 | Henry |
| 9,202,070 B2 | 12/2015 | Rajakarunanayake et al. |
| 9,438,631 B2 | 9/2016 | Bettini |
| 9,565,202 B1 | 2/2017 | Kindlund |
| 9,762,614 B2* | 9/2017 | Ely .................. H04L 63/20 |
| 9,832,603 B2 | 11/2017 | Schlaupitz |
| 9,847,020 B2 | 12/2017 | Davis |
| 9,910,979 B2 | 3/2018 | Ben-Haim |
| 10,291,656 B2* | 5/2019 | Ely .................. H04L 63/14 |
| 10,666,688 B2* | 5/2020 | Ely .................. H04L 63/20 |
| 2001/0014102 A1 | 8/2001 | Mattingly |
| 2002/0095540 A1 | 7/2002 | Zolnowsky |
| 2002/0111824 A1 | 8/2002 | Grainger |
| 2002/0193015 A1 | 12/2002 | Milan |
| 2003/0046397 A1 | 3/2003 | Trace |
| 2003/0055994 A1 | 3/2003 | Herrmann |
| 2003/0070084 A1 | 4/2003 | Satomaa |
| 2003/0084319 A1 | 5/2003 | Tarquini et al. |
| 2003/0097431 A1 | 5/2003 | Dill |
| 2003/0110391 A1 | 6/2003 | Wolff |
| 2003/0126468 A1 | 7/2003 | Markham |
| 2003/0131245 A1 | 7/2003 | Linderman |
| 2003/0142683 A1 | 7/2003 | Lam |
| 2003/0148656 A1 | 8/2003 | Huang |
| 2003/0182415 A1 | 9/2003 | Vicard |
| 2003/0224758 A1 | 12/2003 | O'Neill |
| 2003/0229808 A1 | 12/2003 | Heintz et al. |
| 2004/0003262 A1 | 1/2004 | England |
| 2004/0019656 A1 | 1/2004 | Smith |
| 2004/0064575 A1 | 4/2004 | Rasheed |
| 2004/0078568 A1 | 4/2004 | Pham et al. |
| 2004/0085944 A1 | 5/2004 | Boehm |
| 2004/0093520 A1 | 5/2004 | Lee |
| 2004/0123153 A1 | 6/2004 | Wright |
| 2004/0148450 A1 | 7/2004 | Chen et al. |
| 2004/0177274 A1 | 9/2004 | Aroya |
| 2004/0199763 A1 | 10/2004 | Freund |
| 2004/0203296 A1 | 10/2004 | Moreton |
| 2004/0210775 A1 | 10/2004 | Gbadegesin |
| 2004/0237079 A1 | 11/2004 | Cox |
| 2005/0055578 A1 | 3/2005 | Wright |
| 2005/0091522 A1 | 4/2005 | Hearn |
| 2005/0109841 A1 | 5/2005 | Ryan |
| 2005/0114711 A1 | 5/2005 | Hesselink |
| 2005/0114870 A1 | 5/2005 | Song |
| 2005/0149757 A1 | 7/2005 | Corbett |
| 2005/0182883 A1 | 8/2005 | Overtoom |
| 2005/0208967 A1 | 9/2005 | Buniatyan |
| 2005/0254455 A1 | 11/2005 | Plehn |
| 2005/0260996 A1 | 11/2005 | Groenendaal |
| 2005/0265385 A1 | 12/2005 | Cromer |
| 2005/0278544 A1 | 12/2005 | Baxter |
| 2006/0020723 A1 | 1/2006 | Chia-Chun |
| 2006/0022802 A1 | 2/2006 | Bridgelall |
| 2006/0031940 A1 | 2/2006 | Rozman |
| 2006/0037071 A1 | 2/2006 | Rao |
| 2006/0056317 A1 | 3/2006 | Manning |
| 2006/0059092 A1 | 3/2006 | Burshan |
| 2006/0064391 A1 | 3/2006 | Petrov |
| 2006/0070129 A1 | 3/2006 | Sobel et al. |
| 2006/0074896 A1 | 4/2006 | Thomas |
| 2006/0075494 A1 | 4/2006 | Bertman |
| 2006/0075501 A1 | 4/2006 | Thomas |
| 2006/0085528 A1 | 4/2006 | Thomas |
| 2006/0095595 A1 | 5/2006 | Dalton et al. |
| 2006/0101277 A1 | 5/2006 | Meenan et al. |
| 2006/0161985 A1 | 7/2006 | Zhao |
| 2006/0174342 A1 | 8/2006 | Zaheer |
| 2006/0206300 A1 | 9/2006 | Garg et al. |
| 2006/0224794 A1 | 10/2006 | Stevens |
| 2006/0229741 A1 | 10/2006 | Achanta |
| 2006/0230199 A1 | 10/2006 | Yu |
| 2006/0242686 A1 | 10/2006 | Toda |
| 2006/0272020 A1 | 11/2006 | Gardner |
| 2006/0277405 A1 | 12/2006 | Bowler |
| 2007/0005987 A1 | 1/2007 | Durham |
| 2007/0022474 A1 | 1/2007 | Rowett |
| 2007/0058642 A1 | 3/2007 | Eisink |
| 2007/0061887 A1 | 3/2007 | Hoover |
| 2007/0083939 A1 | 4/2007 | Fruhauf |
| 2007/0097976 A1 | 5/2007 | Wood |
| 2007/0104197 A1 | 5/2007 | King |
| 2007/0110053 A1 | 5/2007 | Soni et al. |
| 2007/0118874 A1 | 5/2007 | Adams |
| 2007/0118893 A1 | 5/2007 | Crawford |
| 2007/0123214 A1 | 5/2007 | Mock |
| 2007/0124536 A1 | 5/2007 | Carper |
| 2007/0130433 A1 | 6/2007 | Safa |
| 2007/0130457 A1 | 6/2007 | Kamat |
| 2007/0143827 A1 | 6/2007 | Nicodemus |
| 2007/0143851 A1 | 6/2007 | Nicodemus |
| 2007/0162582 A1 | 7/2007 | Belali et al. |
| 2007/0192500 A1 | 8/2007 | Lum |
| 2007/0192854 A1 | 8/2007 | Kelley |
| 2007/0199060 A1 | 8/2007 | Touboul |
| 2007/0199061 A1 | 8/2007 | Byres |

(56) References Cited

U.S. PATENT DOCUMENTS

| | | |
|---|---|---|
| 2007/0209067 A1 | 9/2007 | Fogel |
| 2007/0214369 A1 | 9/2007 | Roberts |
| 2007/0220187 A1 | 9/2007 | Kates |
| 2007/0233842 A1 | 10/2007 | Roberts |
| 2007/0240217 A1 | 10/2007 | Tuvell |
| 2007/0261112 A1 | 11/2007 | Todd |
| 2007/0266265 A1 | 11/2007 | Zmudzinski |
| 2007/0281664 A1 | 12/2007 | Kaneko |
| 2007/0294744 A1 | 12/2007 | Alessio |
| 2008/0034419 A1 | 2/2008 | Mullick |
| 2008/0066148 A1 | 3/2008 | Lim |
| 2008/0083030 A1 | 4/2008 | Durham et al. |
| 2008/0083037 A1 | 4/2008 | Kruse |
| 2008/0084799 A1 | 4/2008 | Repasi |
| 2008/0098478 A1 | 4/2008 | Vaidya |
| 2008/0109871 A1 | 5/2008 | Jacobs |
| 2008/0114990 A1 | 5/2008 | Hilbert |
| 2008/0120423 A1 | 5/2008 | Hall et al. |
| 2008/0134163 A1 | 6/2008 | Golde |
| 2008/0141349 A1 | 6/2008 | Lyle |
| 2008/0165957 A1* | 7/2008 | Kandasamy ........ G06F 21/6218 380/44 |
| 2008/0201264 A1 | 8/2008 | Brown |
| 2008/0235755 A1 | 9/2008 | Blaisdell |
| 2008/0282337 A1 | 11/2008 | Crawford |
| 2008/0307240 A1 | 12/2008 | Dahan et al. |
| 2009/0019223 A1 | 1/2009 | Lection |
| 2009/0054075 A1 | 2/2009 | Boejer |
| 2009/0106556 A1 | 4/2009 | Hamid |
| 2009/0135751 A1 | 5/2009 | Hodges et al. |
| 2009/0143057 A1 | 6/2009 | Arun et al. |
| 2009/0165132 A1 | 6/2009 | Jain |
| 2009/0249465 A1 | 10/2009 | Touboul |
| 2009/0253454 A1 | 10/2009 | Sampson |
| 2009/0254993 A1 | 10/2009 | Leone |
| 2010/0064341 A1 | 3/2010 | Aldera |
| 2010/0186093 A1 | 7/2010 | Aussel |
| 2010/0195833 A1 | 8/2010 | Priestley |
| 2010/0218012 A1 | 8/2010 | Joseph |
| 2010/0225493 A1 | 9/2010 | Zishaan |
| 2010/0242109 A1 | 9/2010 | Lee |
| 2010/0251369 A1 | 9/2010 | Grant |
| 2010/0269172 A1 | 10/2010 | Xie |
| 2010/0333088 A1 | 12/2010 | Rogel |
| 2011/0023118 A1 | 1/2011 | Wright |
| 2011/0154443 A1 | 6/2011 | Thakur |
| 2011/0154477 A1 | 6/2011 | Parla |
| 2011/0182180 A1 | 7/2011 | Riddle |
| 2011/0264931 A1 | 10/2011 | Chang |
| 2011/0268106 A1 | 11/2011 | Dalton, Jr. |
| 2011/0269397 A1 | 11/2011 | Bella |
| 2011/0296397 A1 | 12/2011 | Vidal et al. |
| 2012/0005756 A1 | 1/2012 | Hoefelmeyer |
| 2012/0030750 A1* | 2/2012 | Bhargava ............ H04L 63/1416 726/13 |
| 2012/0042391 A1 | 2/2012 | Risan |
| 2012/0054744 A1 | 3/2012 | Singh |
| 2012/0084831 A1 | 4/2012 | Hu |
| 2012/0110320 A1 | 5/2012 | Kumar |
| 2012/0110331 A1 | 5/2012 | Falk |
| 2012/0149350 A1 | 6/2012 | Fan |
| 2012/0173609 A1 | 7/2012 | Kulaga |
| 2012/0185846 A1 | 7/2012 | Recio |
| 2012/0216273 A1 | 8/2012 | Rolette |
| 2012/0233695 A1 | 9/2012 | Mahaffey |
| 2012/0239739 A1 | 9/2012 | Manglik |
| 2012/0240183 A1 | 9/2012 | Sinha |
| 2012/0240236 A1 | 9/2012 | Wyatt |
| 2012/0303971 A1 | 11/2012 | Palka |
| 2012/0324504 A1 | 12/2012 | Archer et al. |
| 2013/0031601 A1 | 1/2013 | Bott |
| 2013/0064373 A1 | 3/2013 | Hagbard |
| 2013/0074144 A1 | 3/2013 | Narayanaswamy |
| 2013/0091534 A1 | 4/2013 | Gilde |
| 2013/0097659 A1 | 4/2013 | Das |
| 2013/0097660 A1 | 4/2013 | Das |
| 2014/0032314 A1 | 1/2014 | Gieseke |
| 2014/0058679 A1 | 2/2014 | Varoglu |
| 2014/0317679 A1 | 10/2014 | Wade |
| 2016/0105847 A1 | 4/2016 | Smith |
| 2016/0234204 A1 | 8/2016 | Rishi |
| 2017/0039367 A1 | 2/2017 | Ionescu |
| 2017/0103647 A1 | 4/2017 | Davis |

FOREIGN PATENT DOCUMENTS

| | | |
|---|---|---|
| WO | 2006069041 | 6/2006 |
| WO | 2007110094 | 10/2007 |
| WO | 2008154726 | 12/2008 |
| WO | 2009004452 | 1/2009 |
| WO | 2010004296 | 1/2010 |

OTHER PUBLICATIONS

Claessens, Joris et al., "(How) Can Mobile Agents Do Secure Electronic Transactions on Mobile Hosts? A Survey of the Security Issues and the Current Solutions," ACM Transactions on Internet Technology, vol. 3, No. 1, pp. 28-48, Feb. 2003.

CyberGuard Corporation, "Model 1: Wireless Mobile Security Appliance," located at http://support2.cyberguard.com/products/oem/model1.htm, 2005.

Entry, Inc., "CyberGuard Develops a Custom Mobile Security Appliance," SecurityProNews, located at http://www.securitypronews.com/news/securitynews/spn-45-20041007CyberGuardDevelo . . . , Oct. 7, 2004.

Fielding, R. et al., "Hypertext Transfer Protocol—HTTP/1.1," I.E.T.F. Network Working Group, RFC 2616, Jun. 1999.

Hall, Marty, "Core Web Programming: Chapter 16—The Hypertext Transfer Protocol," Prentice Hall PTR, ISBN 0-13-625666-X, pp. 867-911, Dec. 1997.

Hall, Marty, "More Servlets and JavaServer p. Chapter 2—A Fast Introduction to Basic Servlet Programming," Prentice Hall PTR, ISBN 0-13-067614-4, pp. 34-118, Dec. 1997.

Henmi, Anne et al., "Firewall Policies and VPN Configurations," Syngress Publishing, Inc., ISBN 1-59749-088-1, pp. 99-133, 291-313, Dec. 2006.

Jakobsson, Markus, "Invasive Browser Sniffing and Countermeasures," Proceedings of the 15th International Conference on World Wide Web, pp. 523-532, May 23, 2006.

Kent, S. et al., "Security Architecture for the Internet Protocol," I.E.T.F. Network Working Group, RFC 4301, pp. 10-11, Dec. 2005.

Lee, Henry C.J. et al., "Port Hopping for Resilient Networks," IEEE 60th Vehicular Technology Conference (VTC2004), Sep. 26, 2004.

Liang et al., "Passive Wake-up Scheme for Wireless Sensor Networks", Second International Conference on Innovative Computing, Information and Control, 2007, 4 pages.

Lim et al., "Adaptice power controllable retrodirective array system for wireless sensor server applications", IEEE Transactions on Microwave Theory and Techniques, vol. 53, No. 12, Dec. 2005, pp. 3735-3743.

O'Brien, Kevin J., "Microsoft Hit by Antitrust Complaint for Browser," The International Herald Tribune, Dec. 14, 2007.

PMC-Sierra, Inc., "MSP8120 Multi-Service Security Processor," Product Brief, 2007.

Prevelakis, Vassilis et al., "Drop-In Security for Distributed and Portable Computing Elements," Internet Research: Electronic Networking, Applications and Policy, vol. 13, No. 2, pp. 107-115, located at http://www.cs.columbia.edu/~angelos/Papers/InternetResearch-Final.pdf, 2003.

Sen, Subhabrata et al., "Accurate, Scalable In-Network, Identification of P2P Traffic Using Application Signatures," Proceedings of the 13th International Conference on World Wide Web, pp. 512-521, May 17, 2004.

Shreeve, Jimmy Lee, "Hasta la Vista, Microsoft!; It's Faster than Windows, It Fights Viruses—and It's Free," Independent Extra, Aug. 29, 2007.

(56) References Cited

OTHER PUBLICATIONS

Shuler, Rus, "How Does the Internet Work," white paper, 2002 [retrieved online at https://web.stanford.edu/class/msande91si/www-spr04/readings/week1/InternetWhitepaper.htm on Dec. 11, 2018].

Srisuresh, P. et al., "IP Network Address Translator (NAT) Terminology and Considerations," I.E.T.F. Network Working Group, RFC 2663, Aug. 1999.

Srisuresh, P. et al., "Traditional IP Network Address Translator (Traditional NAT)," I.E.T.F. Network Working Group, RFC 3022, Jan. 2001.

WatchGuard Technologies, Inc., "Mobile User VPN and PPTP," Internet Security Handbook, copyright 1998-2001, pp. 1-2, located at http://www.watchguard.com/help/lss/41/handbook/vpn3.htm, believe published Jun. 5, 2003.

World Wide Web Consortium (W3C), "HTTP Request Fields," May 3, 1994 [retrieved online at https://web.archive.org/web/20060110150527/http://www.w3.org:80/Protocols/HTTP/HTRQ_Headers.html on Jan. 24, 2019].

ZyXEL Communications Corp., "ZyXEL Releases Worlds First Palm-Sized Portable Personal Firewall for Ultimate Security: ZyWALL P1 Pushes Network Security to the End-Point PC's with Minimum Administration Effort," ZyXEL News, located at http://global.zyxel.com/news/press.php?indexflag=20050310013432, Mar. 8, 2005.

European Patent Application No. 06821641.5, Examination Report dated Dec. 16, 2016.

European Patent Application No. 06821641.5, Search Report dated May 17, 2011.

European Patent Application No. 08847968.8, Search Report dated Oct. 25, 2011.

European Patent Application No. 13845746.0, Search Report dated Jun. 7, 2016.

International Application No. PCT/IL2006/001428, International Search Report and Written Opinion dated Jul. 15, 2008.

International Application No. PCT/IL2008/000740, International Search Report and Written Opinion dated Nov. 5, 2008.

International Application No. PCT/US2008/055942, International Search Report and Written Opinion dated Apr. 6, 2009.

International Application No. PCT/US2009/065204, International Search Report and Written Opinion dated Jan. 13, 2010.

International Application No. PCT/US2013/064161, International Search Report and Written Opinion dated Apr. 18, 2014.

International Application No. PCT/US2014/045826, International Search Report and Written Opinion dated Oct. 30, 2014.

International Application No. PCT/US2015/015970, International Search Report and Written Opinion dated May 28, 2015.

Decision—Institution of Inter Partes Review of U.S. Pat. No. 9,781,164 entered Jun. 25, 2019, 28 pages.

Decision—Institution of Inter Partes Review of U.S. Pat. No. 8,631,488 entered Aug. 28, 2019, 39 pages.

Decision—Institution of Inter Partes Review of U.S. Pat. No. 9,106,683 entered Aug. 28, 2019, 39 pages.

Decision—Institution of Inter Partes Review of U.S. Pat. No. 9,843,595 entered Aug. 28, 2019, 33 pages.

Decision—Institution of Inter Partes Review of U.S. Pat. No. 8,365,272 entered Jul. 26, 2019, 27 pages.

Decision—Institution of Inter Partes Review of U.S. Pat. No. 9,756,079 entered Jul. 26, 2019, 32 pages.

Decision—Institution of Inter Partes Review of U.S. Pat. No. 8,789,202 entered Sep. 18, 2019, 33 pages.

"Helping Users Deal with Digital Threats: The Online User Supervision Architecture", Living with Insecurity, IEEE Security & Privacy, IEEE Computerand Reliability Societies, downloaded from <URL: https://ieeexplore.ieee.org/stamp/stamp.jsp?tp=&arnumber=5959149>, Nov./Dec. 2011 (Year: 2011), pp. 29-35.

"Method and System to Provide Automatic Parental Control in Television Broadcasting Environment", downloaded through IP.com, IP.com No. IPCOM000221537D, Sep. 7, 2012 (Year: 2012), 3 pages.

*CUPP Cybersecurity, LLC and CUPP Computing AS v. Trend Micro, Inc., Trend Micro America, Inc., and Trend Micro Incorporated*, Case No. 20-cv-03206-M, First Amended Complaint for Patent Infringement, filed Apr. 23, 2021, 140 pages.

*CUPP Cybersecurity, LLC and CUPP Computing AS v. Trend Micro, Inc., Trend Micro America, Inc., and Trend Micro Incorporated*, Case No. 3:20-cv-03206-K, Complaint for Patent Infringement, filed Oct. 20, 2020, 99 pages.

*Trend Micro Inc. v. CUPP Computing AS*, IPR2019-00765, U.S. Pat. No. 9,843,595, Judgment Final Written Decision Determining All Challenged Claims Unpatentable entered Aug. 25, 2020, 47 pages.

*Trend Micro Inc. v. CUPP Computing AS*, IPR2019-00803, U.S. Pat. No. 8,789,202, Judgment Final Written Decision Determining No Challenged Claims Unpatentable entered Sep. 15, 2020, 30 pages.

Decision Granting Institution of Inter Partes Review of U.S. Pat. No. 10,621,344 entered Oct. 25, 2021, 38 pages.

Decision Granting Institution of Inter Partes Review of U.S. Pat. No. 10,951,632 entered Jan. 19, 2022, IPR2021-01236, 46 pages.

Decision Granting Institution of Inter Partes Review of U.S. Pat. No. 10,951,632 entered Jan. 19, 2022, IPR2021-01237, 25 pages.

* cited by examiner

SYSTEMS AND METHODS FOR PROVIDING NETWORK SECURITY USING A SECURE DIGITAL DEVICE

CROSS-REFERENCE TO RELATED APPLICATIONS

This application is a continuation of U.S. patent application Ser. No. 16/299,087, filed Mar. 11, 2019 and entitled "Systems and Methods for Providing Network Security Using a Secure Digital Device," now U.S. Pat. No. 10,666,688, which is a continuation of U.S. patent application Ser. No. 15/701,365, filed Sep. 11, 2017 and entitled "Systems and Methods for Providing Network Security Using a Secure Digital Device," now U.S. Pat. No. 10,291,656, which is a continuation of U.S. patent application Ser. No. 14/622,764, filed Feb. 13, 2015 and entitled "Systems and Methods for Providing Network Security Using a Secure Digital Device," now U.S. Pat. No. 9,762,614, which claims priority to U.S. Provisional Patent Application Ser. No. 61/943,364, filed Feb. 22, 2014 and entitled "Systems and Methods for Providing Network Security Via an SD Interface," and to U.S. Provisional Patent Application Ser. No. 61/939,644, filed Feb. 13, 2014 and entitled "Systems and Methods for Providing Network Security Via an SD Interface," all of which are hereby incorporated by reference herein.

TECHNICAL FIELD

The technical field relates to computer security systems and methods. More specifically, the technical field relates to systems and methods for providing security to a digital device using a secure digital device.

BACKGROUND

Computer networks have proven to be a valuable source of information and entertainment for many users. Although the architecture of a specific computer network depends on numerous factors, many computer networks interact with access points, other devices, network resources, network nodes, transmission media etc. that may communicate viruses, spyware, adware, worms, Trojan Horses, and other malicious code.

Portable electronic devices, such as mobile phones, tablet computing devices, and laptop computers, have proven particularly susceptible to these malicious threats. As many portable electronic devices have the capability to travel to different locations, they have the capability to access different individual computer networks at each different location. Although many devices seeking to access a computer network use anti-malware hardware and/or software for protection against malicious code, many security frameworks are not easily applicable to portable electronic devices. It would be helpful to provide security systems that effectively allow portable electronic devices to defend against malicious code. It would also be helpful if the security systems were compatible with existing hardware and/or software configurations of many portable electronic devices.

SUMMARY

A system may include a traffic interception module configured to intercept network traffic of a host device. A traffic virtualization module may be configured to generate a virtual file on the host device containing the intercepted network traffic. A security system interface module may be configured to provide the virtual file to a secure digital security system over a virtualized file interface coupling the host device to the secure digital security system, and to receive instructions to allow or to deny the network traffic from the secure digital security system over the virtualized file interface. A traffic access management module may be configured to allow or to deny the network traffic based on the instructions.

In some embodiments, the network traffic comprises outgoing network traffic. The network traffic may comprise incoming network traffic.

The system may include a virtualized traffic encryption module configured to encrypt the virtual file before the security system interface module provides the virtual file to the secure digital security system over the virtualized file interface. The traffic interception module may be configured to monitor one or more applications and/or processes for the presence or absence of the network traffic. The traffic interception module is configured to monitor one or more root-level processes of a network interface for the presence or absence of the network traffic.

The secure digital security system may be incorporated into a Secure Digital (SD) card coupled to the host device. In some embodiments, the host device comprises a portable electronic device.

A secure digital security system may comprise a virtualized file management module configured to receive a virtual file from a host device over a virtualized file interface coupling the host device to the secure digital security system, the virtual file containing network traffic intercepted at the host device. A security policy management module may be configured to evaluate the network traffic for compliance with a security policy. A traffic access determination module may be configured to determine whether to allow or deny the specific network traffic in accordance with the security policy. An instruction providing module may be configured to provide to the host device over the virtualized file interface instructions allowing or denying the specific network traffic.

In some embodiments, the network traffic comprises outgoing network traffic. The network traffic may comprise incoming network traffic.

The virtual file may comprise an encrypted virtual file. The secure digital security system is may be incorporated into a Secure Digital (SD) card coupled to the host device. In various embodiments, the host device comprises a portable electronic device.

A method may comprise: intercepting network traffic at a host device; generating a virtual file on the host device containing the network traffic; providing the virtual file to a secure digital security system over a virtualized file interface coupling the host device to the secure digital security system; receiving over the virtualized file interface instructions allowing or denying the network traffic from the secure digital security system; and allowing or denying the specific network traffic based on the instructions.

In some embodiments, the network traffic comprises outgoing network traffic. The network traffic may comprise incoming network traffic.

The virtual file may be encrypted before being provided to the secure digital security system over the virtualized file interface. Monitoring network traffic may comprise monitoring one or more applications and/or processes. Monitoring the network traffic may comprise monitoring one or more root-level processes of a network interface.

The virtual file may comprise an encrypted virtual file. The secure digital security system is may be incorporated into a Secure Digital (SD) card coupled to the host device. In various embodiments, the host device comprises a portable electronic device.

A method may comprise: receiving a virtual file from a host device over a virtualized file interface, the virtual file containing network traffic intercepted at a host device; evaluating the network traffic for compliance with a security policy; determining whether to allow or to deny the network traffic in accordance with the security policy; and providing over the virtualized file interface to the host device instructions allowing or denying the network traffic.

In some embodiments, the network traffic comprises outgoing network traffic. The network traffic may comprise incoming network traffic.

The virtual file may comprise an encrypted virtual file. The secure digital security system is may be incorporated into a Secure Digital (SD) card coupled to the host device. In various embodiments, the host device comprises a portable electronic device.

DETAILED DESCRIPTION

Portable electronic devices face many security challenges. As portable electronic devices have the ability to travel from one location to another, they typically have the ability to access different computer networks and different devices. This portability often carries with it risk of security threats. Moreover, as the hardware and software resources of portable electronic devices are often limited, portable electronic devices are often unable to use the same anti-malware hardware and/or software that their desktop counterparts that reside within a protected environment. It would be helpful to have systems and methods that secure portable electronic devices from malicious code, particularly given the portability and the hardware and/or software constraints of portable electronic devices.

Portable electronic devices, such as Android® smartphones and tablet devices, often use secure digital (SD) devices, e.g., SD cards, to store and retrieve files and other data. Secure digital devices typically do not support network traffic for host devices, or at best only support network traffic at transfer speeds that are unreasonably slow (e.g., 100's kb/s), especially compared to the file transfer speeds of these secure storage devices (e.g., 10's MB/s).

Accordingly, various embodiments herein capitalize on the rapid file transfer capabilities of secure digital devices to scan and evaluate network traffic for compliance with security policies. In various embodiments, network traffic may be intercepted at a host device and redirected to the secure digital device that processes the security policy stored thereon. In some embodiments, the network traffic may be virtualized and provided as a virtual file to the secure digital device using a file system interface between the host device and the secure digital device. The secure digital device can evaluate the network traffic in accordance with the security policy and may provide the host system with instructions to allow or deny the network traffic.

Figure 1:
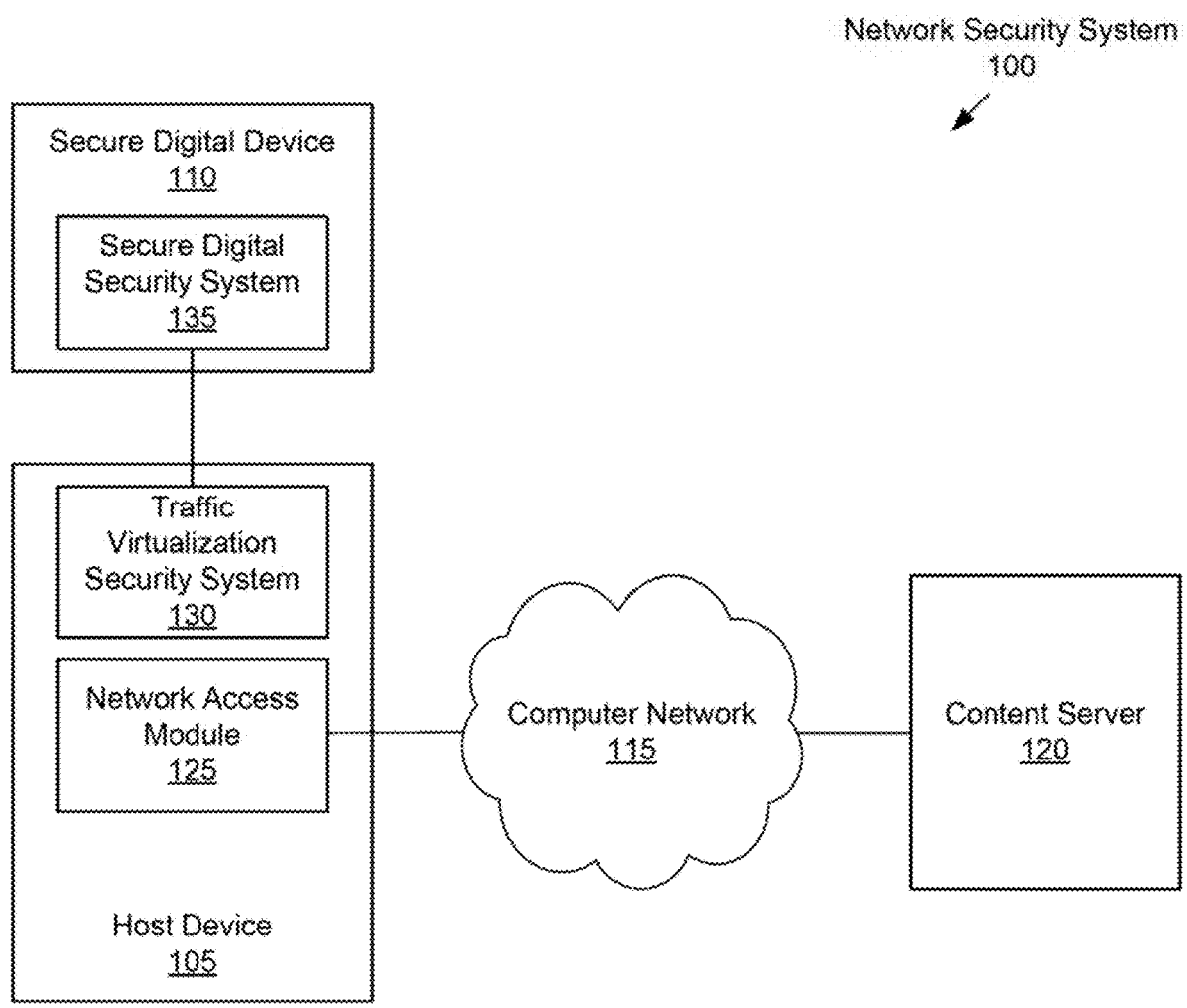
FIG. 1 is a diagram showing an example of a network security system, according to some embodiments.

FIG. 1 is a diagram showing an example of a network security system 100, according to some embodiments. The network security system 100 includes a host device 105, a secure digital device 110 coupled to the host device 105, a computer network 115 coupled to the host device 105, and a content server 120 coupled to the computer network 115. In various embodiments, the host device 105 is protected from malicious code through the secure digital device 110. As discussed further herein, network traffic may be intercepted at the host device 105, incorporated into a streaming file using virtualization techniques on the host device 105, and provided to the secure digital device 110 for analysis in accordance with a security policy. The secure digital device 110 may include a secure digital security system 135 capable of evaluating the network traffic relative to the security policy, and capable of instructing the host device 105 to allow or block the network traffic based on the evaluation.

The host device 105 may include a digital device. A digital device, as described herein, may include any electronic device having a memory and a processor. The host device 105 may have some or all of the components of the digital device 1200, shown in FIG. 12, and discussed further herein. In some embodiments, the host device 105 includes a portable electronic device, such as a mobile phone, a tablet computing device, a laptop computer, etc. In various embodiments, the host device 105 has a mobile operating system installed thereon. Examples of mobile operating systems include Android®-based operating systems, Windows Phone®-based operating systems, and Apple's OS ("iOS") operating systems.

In some embodiments, the host device 105 includes a network access module 125 and a traffic virtualization security system 130. The network access module 125 may include hardware, software, and/or firmware operative to access communications to and from the computer network 115. In some embodiments, the network access module 125 includes a Network Interface Card ("NIC"). The network access module 125 may include wireless radios, antennae, and other input/output hardware, software, and/or firmware that allows the host device 105 to communicate with the computer network 115, wired or wirelessly. In some embodiments, the network access module 125 may include a cellular data connection, a WiFi connection, a Bluetooth® connection, etc.

The network access module 125 may operate to provide outgoing network traffic to the computer network 115 and may receive incoming network traffic from the computer network 115. Outgoing network traffic may include any data from the host device 105 that is directed to the computer network 115. In some embodiments, outgoing network traffic may include traffic related to requests for network resources. For instance, outgoing network traffic may include web content requests from applications, processes, etc. on the host device 105 for content on the content server 120. Outgoing network traffic may also include file transfer requests for files on the content server 120 requested by applications, processes, etc. on the host device 105. In some embodiments, outgoing network traffic may include network traffic that is related to confidential data on the host device 105 that is not to be provided to the computer network 115. For example, outgoing network traffic may include requests attempting to release usernames, passwords, account information, Short Messaging System ("SMS") numbers, and/or other confidential data from the host device 105.

The network access module 125 may also operate to receive incoming network traffic from the computer network 115. Incoming network traffic may include any data the host device 105 receives from the computer network 115. Examples of incoming network traffic include content from networked resources. For instance, incoming network traffic may include web content, files, data, music, video, executables, scripts, etc. from the content server 120.

Figure 6:
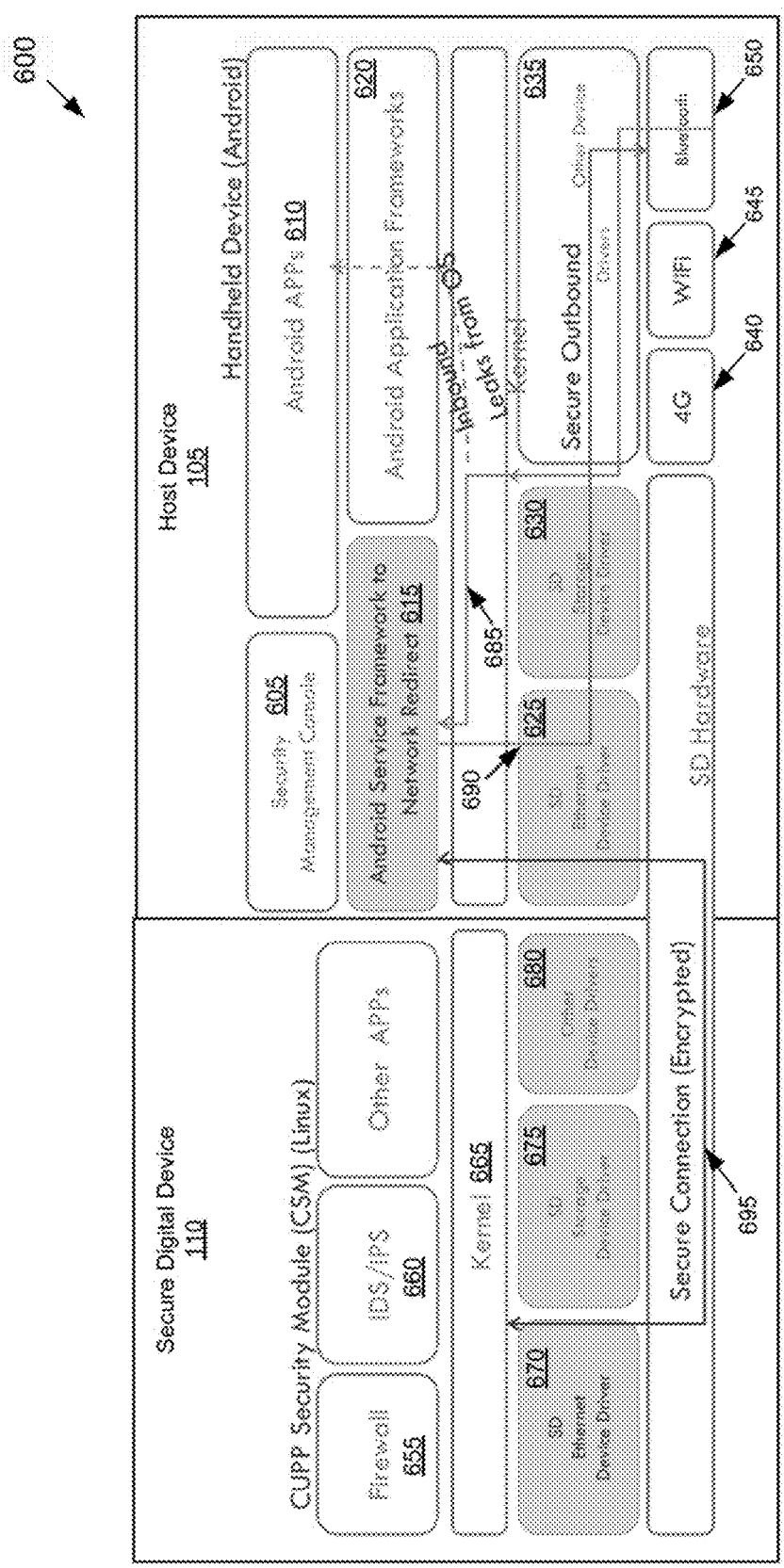
FIG. 6 is a diagram showing an example of a host device and a secure digital device, according to some application-level redirect embodiments.

The traffic virtualization security system 130 may include hardware, software, and/or firmware operative to identify, virtualize, and redirect network traffic to and from the secure digital security system 135. In some embodiments, the traffic virtualization security system 130 may be incorporated into application-level software (e.g., network service redirection frameworks) of the host device 105. These embodiments may be referred to herein as "application-level redirect" embodiments. In application-level redirect embodiments, the traffic virtualization security system 130 may monitor one or more applications and/or processes for the presence or absence of outgoing network traffic and/or incoming network traffic. Some application-level redirect embodiments may only monitor applications and/or processes for the presence or absence of outgoing network traffic. FIG. 6 shows some application-level redirect embodiments in greater detail.

Figure 7:
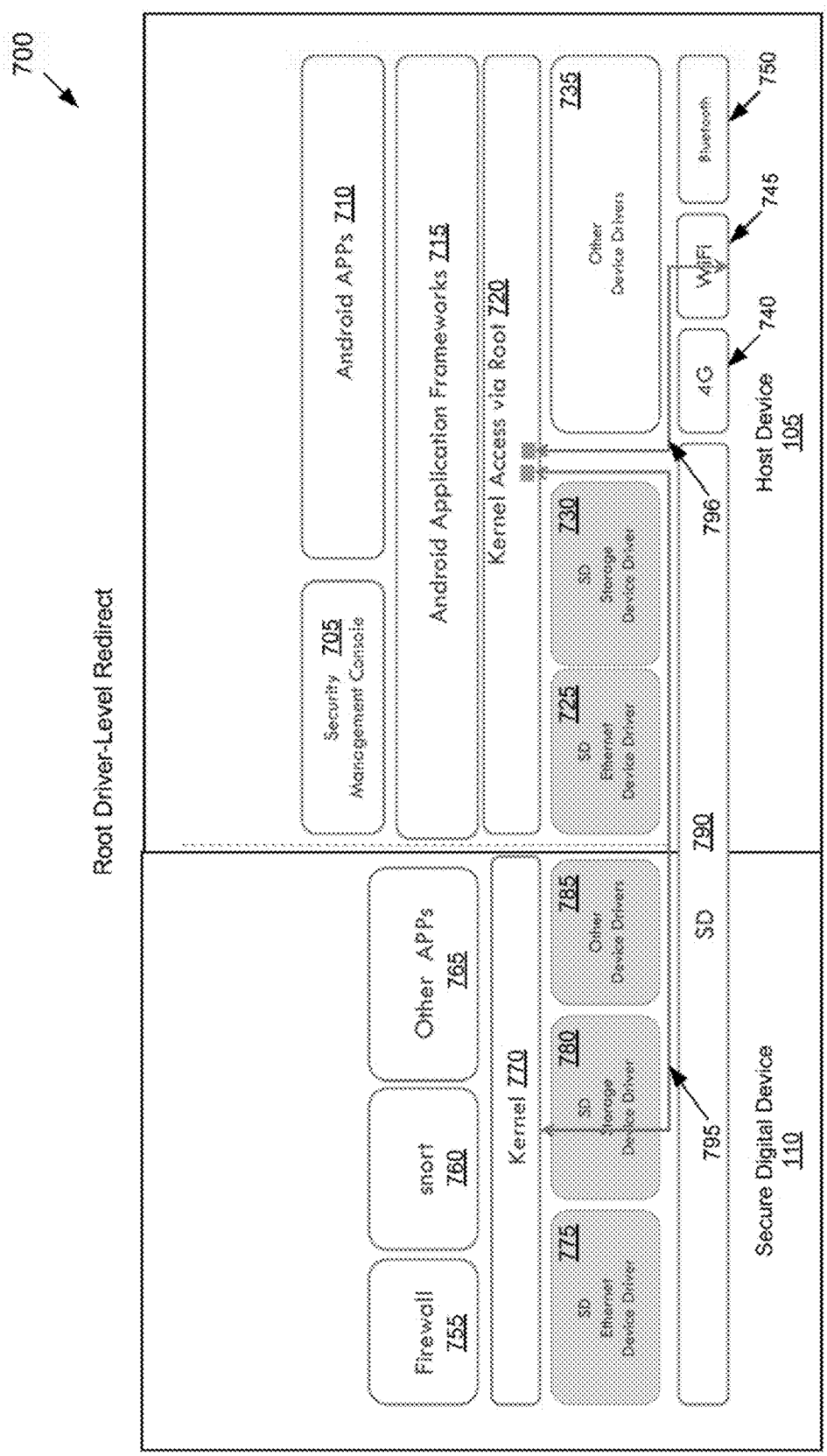
FIG. 7 is a diagram showing an example of a host device and a secure digital device, according to some root-level redirect embodiments.

In some embodiments, the traffic virtualization security system 130 is incorporated into system-level software, such as drivers, kernel level software, etc., of the host device 105. These embodiments may be referred to herein as "root-level redirect" embodiments. In root-level redirect embodiments, the traffic virtualization security system 130 may be incorporated into device drivers and/or kernel-level processes of the NIC of the host device 105. In root-level redirect embodiments, the traffic virtualization security system 130 monitors one or more root-level processes of the host device 105 for the presence or absence of outgoing network traffic and/or incoming network traffic. In some embodiments, the root-level redirect code may be part of the network access module 125. FIG. 7 shows some root-level redirect embodiments in greater detail.

In various embodiments, the traffic virtualization security system 130 is operative to intercept outgoing network traffic before the outgoing network traffic reaches the computer network 115. The traffic virtualization security system 130 may also be operative to intercept incoming network traffic before the incoming network traffic has exited the network access module 125. The traffic virtualization security system 130 may further use virtualization techniques to virtualize intercepted network traffic to produce a virtual file that represents intercepted network traffic.

Figure 2:
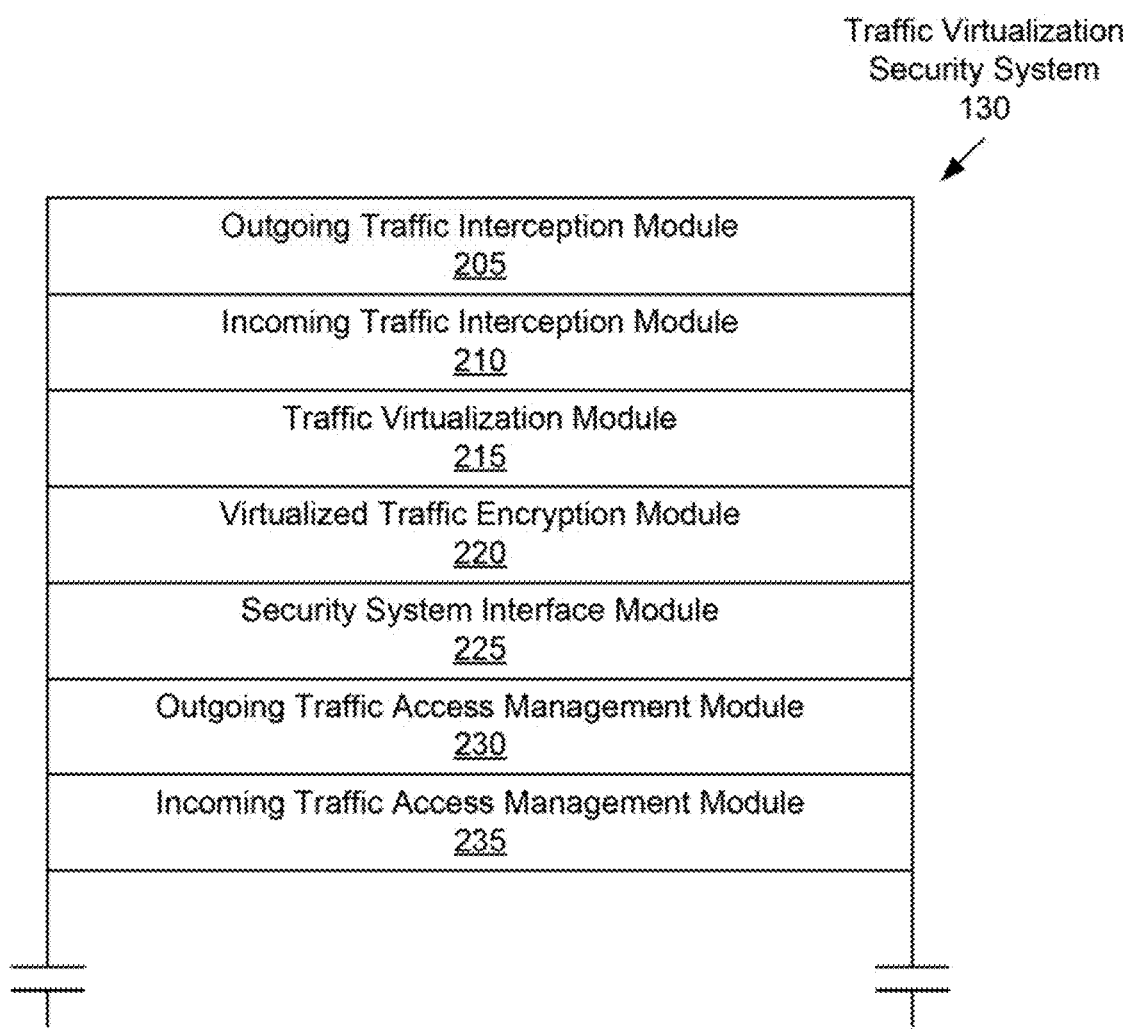
FIG. 2 is a diagram showing an example of a traffic virtualization security system, according to some embodiments.

Using encryption techniques, the traffic virtualization security system 130 may encrypt the virtual file into a format that can be secured from unauthorized access. The traffic virtualization security system 130 may also stream an encrypted virtual file to the secure digital security system 135, where the encrypted virtual file are evaluated for malicious code, as described further herein. The secure digital security system 135 may instruct the traffic virtualization security system 130 to allow or to deny access by network traffic to the computer network 115. In various embodiments, the traffic virtualization security system 130 includes hardware, software, and/or firmware operative to allow or deny access based on instructions from the secure digital security system 135. FIG. 2 shows the traffic virtualization security system 130 in greater detail.

Figure 5:
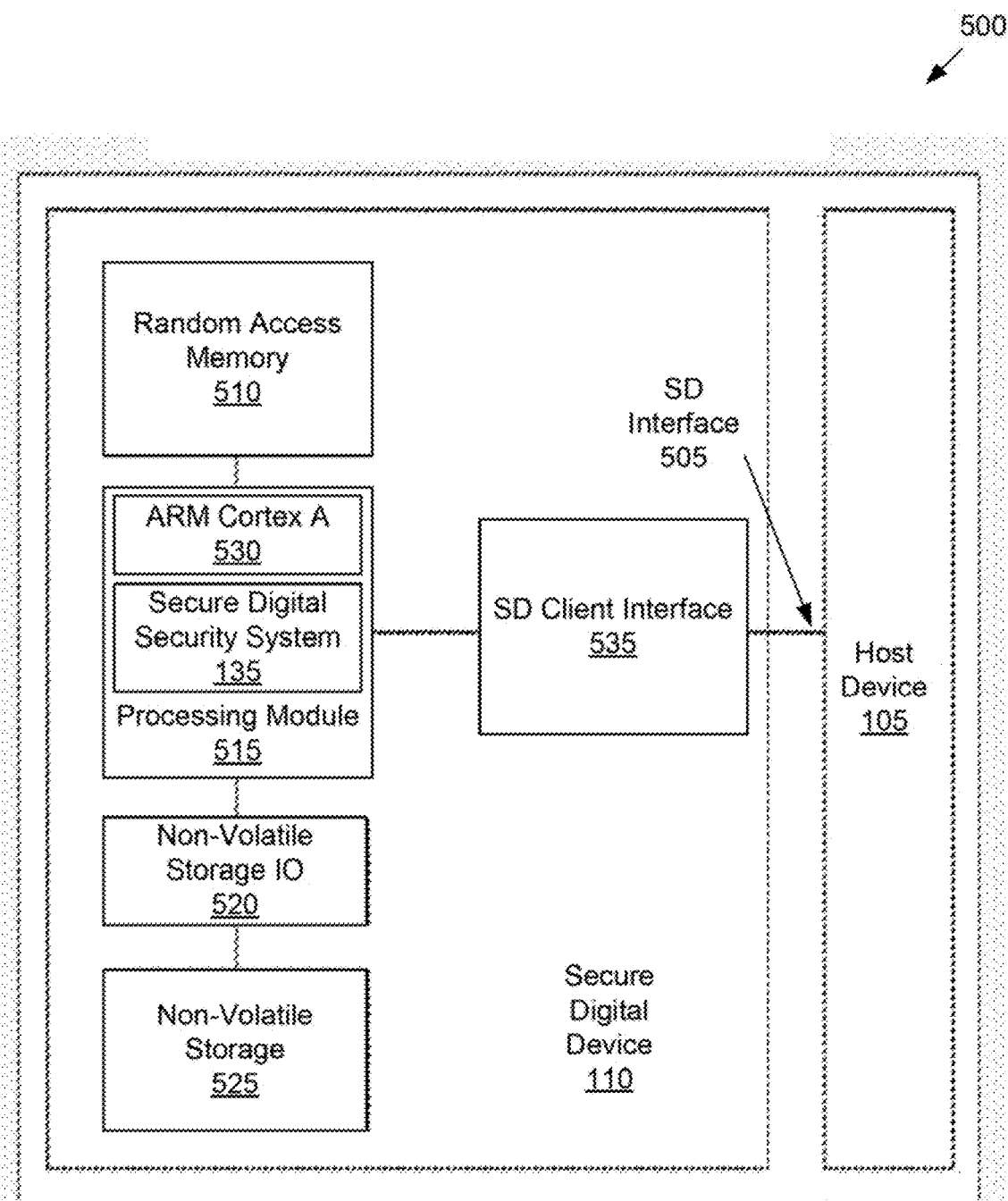
FIG. 5 is a diagram showing an example of a host device and a secure digital device, according to some embodiments.

The secure digital device 110 may include a digital device that can be coupled to the host device 105. In various embodiments, the secure digital device 110 may comprise a Secure Digital (SD) card such as a micro SD (μSD) card. The secure digital device 110 may further include a processor, memory, and storage. For example, in some embodiments, the secure digital device 110 includes a OD card having a processor, Flash memory, and Random Access Memory (RAM) (e.g., Double Data Rate (DDR) RAM). The processor, memory, and storage of the secure digital device 110 may be independent of the processor, memory, and storage of the host device 105. As a result, in various embodiments, security-related tasks may be offloaded from the host device 105 to the secure digital device 110 and/or may augment the security-related tasks occurring on the host device 105. Using a separate processor, memory, and storage may also immunize the secure digital device 110 to threats targeted to the host device 105, and may allow the secure digital device 110 the ability to monitor the host device 105 for changes from known security baselines. The secure digital device 110 may also have SD client software installed thereon. FIG. 5 shows components of an embodiment of the secure digital device 110 in greater detail.

The secure digital security system 135 includes hardware, software, and/or firmware operative to scan (and possibly decrypt) the virtual file that represents intercepted network traffic. In some embodiments, the secure digital security system 135 comprises an operating system that is distinct from the operating system of the host device 105. For example, the secure digital security system 135 may include a mobile operating system (e.g., a Linux®-based operating system) that is independent of the operating system of the host device 105. Further, the secure digital security system 135 may incorporate a proxy server that supports the traffic virtualization security system 130. In various embodiments, the secure digital security system 135 operates to evaluate the network traffic represented in virtual files for compliance with Intrusion Detection and/or Prevention policies, firewalls, anti-malware policies, web filters, etc.

Figure 3:
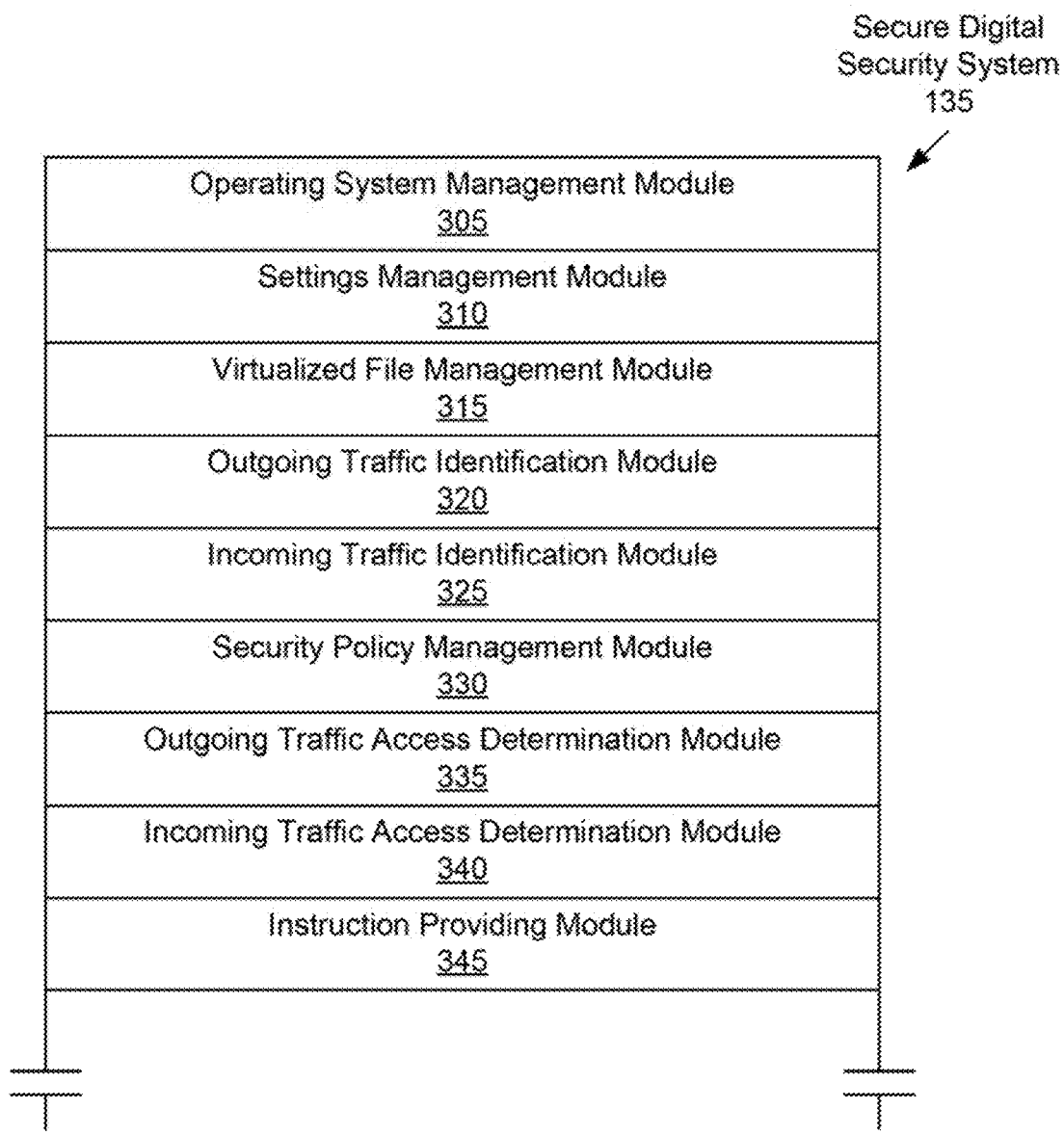
FIG. 3 is a diagram showing an example of a secure digital security system, according to some embodiments.

In various embodiments, the secure digital security system 135 may operate in two or more modes, including a security mode and a storage mode. In the security mode, the secure digital security system 135 may provide the security functions described herein. In the storage mode, the secure digital storage device (e.g., a μSD device) may operate as a storage device. FIG. 3 shows the secure digital security system 135 in greater detail.

The computer network 115 may include a medium that couples digital devices to one another. The computer network 115 may include technologies such as Ethernet, 802.11x, worldwide interoperability for microwave access WiMAX, 2G, 3G, 4G, CDMA, GSM, LTE, digital subscriber line (DSL), and/or the like. The computer network 115 may further include networking protocols such as multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and/or the like. The data exchanged over the computer network 115 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec). Although element 115 is labeled a "computer network" in FIG. 1, it is noted that in various embodiments, the element 115 may refer to any medium that facilitates digital devices to other digital devices, or components of digital devices to other components of digital devices. In various embodiments, the element 115 may refer to a bus, cable, or other device used to couple components of a digital device to one another.

The content server 120 may include a digital device configured to provide content (e.g., web pages, executables, scripts, data, etc.) to the host device 105. In various embodiments, the content server 120 represents any source of incoming network traffic to the host device 105. For instance, the content server 120 may include web servers, file servers, other devices coupled to the computer network 115, etc.

FIG. 2 is a diagram showing an example of a traffic virtualization security system 130, according to some embodiments. The traffic virtualization security system 130 includes an outgoing traffic interception module 205, an incoming traffic interception module 210, a traffic virtualization module 215, a virtualized traffic encryption module 220, a security system interface module 225, an outgoing traffic access management module 230, and an incoming traffic access management module 235.

The outgoing traffic interception module 205 may include hardware, software, and/or firmware operative to intercept outgoing network traffic from the host device 105. In application-level redirect embodiments, the outgoing traffic interception module 205 monitors network calls of applications and/or processes of the host device 105 for the presence or absence of outgoing network traffic. In root-level redirect embodiments, the outgoing traffic interception module 205 may monitor (e.g., hook) system- and/or kernel-processes of the network access module 125 for the presence or absence of outgoing network traffic. The outgoing traffic interception module 205 may provide intercepted outgoing network traffic to the other modules of the traffic virtualization security system 130.

The incoming traffic interception module 210 may include hardware, software, and/or firmware operative to intercept incoming network traffic to the host device 105. In application-level redirect embodiments, the incoming traffic interception module 210 monitors the network calls of applications and/or processes of the host device 105 for the presence or absence of incoming network traffic. It is noted some application-level redirect embodiments may not monitor the network calls of applications and/or processes of the host device 105 for the presence or absence of incoming network traffic. In root-level redirect embodiments, the incoming traffic interception module 210 may monitor (e.g., hook) system- and/or kernel-processes of the network access module 125 for the presence or absence of incoming network traffic. The incoming traffic interception module 210 may intercept relevant incoming network traffic. The incoming traffic interception module 210 may further provide intercepted incoming network traffic to the other modules of the traffic virtualization security system 130.

The traffic virtualization module 215 may include hardware, software, and/or firmware operative to incorporate the network traffic that has been intercepted by one or more of the outgoing traffic interception module 205 and the incoming traffic interception module 210 into a virtual file. In specific embodiments, the traffic virtualization module 215 may use Virtual Private Network (VPN) frameworks associated with the operating system of the host device 105 to create a virtual file and/or modify an existing virtual file. For example, the traffic virtualization module 215 may use VPN tables in the operating system of the host device 105 to create the virtual file. In various embodiments, the traffic virtualization module 215 may insert headers and/or other information into portions (e.g., packets) of the virtual file so that intercepted network traffic can be distinguished from other data, such as data to be stored on the secure digital device 110. The traffic virtualization module 215 may provide the virtual file to one or more of the other modules of the traffic virtualization security system 130.

The virtualized traffic encryption module 220 may include hardware, software, and/or firmware operative to encrypt the virtual file so that the virtual file is secure from access by unauthorized entities. In some embodiments, the virtualized traffic encryption module 220 uses encryption protocols that ensure that only a device that can decrypt the virtual file, e.g., the secure digital device 110, can read the virtual file. Any convenient encryption protocols may be employed. In various embodiments, the virtualized traffic encryption module 220 provides the encrypted virtual file to the other modules of the traffic virtualization security system 130.

The security system interface module 225 may include hardware, software, and/or firmware to interface with the secure digital security system 135. More specifically, the security system interface module 225 may provide a connection to the secure digital security system 135. In various embodiments, the security system interface module 225 is part of a SD card interface to the secure digital device 110. The connection may include a virtualized file interface, such as a VPN (e.g., a virtual Input/output (I/O) faux-file system). In application-level redirect embodiments, the connection may comprise a secure and encrypted coupling between the network service redirection frameworks of the host device 105 and a kernel of the secure digital device 110. In root-level redirect embodiments, the connection may comprise a secure and encrypted coupling between a portion of the kernel of the host device 105 and a portion of the kernel of the secure digital device 110. The security system interface module 225 may use the connection to stream the encrypted virtual file to the secure digital security system 135.

In various embodiments, the security system interface module 225 may await evaluation results from the secure digital security system 135, as discussed further herein. The security system interface module 225 may receive, from the secure digital security system 135, instructions whether to allow or to deny specific outgoing network traffic and/or specific incoming network traffic. In various embodiments, the instructions may be provided over the virtualized file interface. The security system interface module 225 may provide the instructions to the other modules of the traffic virtualization security system 130.

The outgoing traffic access management module 230 may include hardware, software, and/or firmware operative to allow or to deny outgoing network traffic. The determination whether to allow or to deny outgoing network traffic may be based on instructions from the secure digital security system 135, as discussed further herein. In some application-level redirect embodiments, the outgoing traffic access management module 230 allows and/or denies access to the computer network 115 by specific network calls of applications and/or processes of the host device 105. In some root-level redirect embodiments, the outgoing traffic access management module 230 allows and/or denies access to the computer network 115 by system- and/or kernel-processes of the network access module 125.

The incoming traffic access management module 240 may include hardware, software, and/or firmware operative to allow or to deny incoming network traffic. The determination whether to allow or to deny incoming network traffic may be based on instructions from the secure digital security system 135, as discussed further herein. In some embodiments, the incoming traffic access management module 240 allows and/or denies incoming network traffic access to portions of the host device other than the network access module 125 and the traffic virtualization security system 130. For instance, the incoming traffic access management module 240 may limit incoming network traffic access rights outside the NIC of the host device 105.

FIG. 3 is a diagram showing an example of a secure digital security system 135, according to some embodiments. The secure digital security system 135 includes an operating system management module 305, a settings management module 310, a virtualized file management module 315, an outgoing traffic identification module 320, an incoming traffic identification module 325, a security policy management module 330, an outgoing traffic access determination module 335, an incoming traffic access determination module 340, and an instruction providing module 345.

The operating system management module 305 may include hardware, software, and/or firmware operative to manage an operating system of the secure digital security system 135. In various embodiments, the operating system management module 305 loads and maintains the operating system of the secure digital security system 135. The operating system management module 305 may also support any proxy servers maintained by the secure digital security system 135.

The settings management module 310 may include hardware, software, and/or firmware operative to manage settings of the secure digital security system 135. In some embodiments, the settings management module 310 may receive instructions from the traffic virtualization security system 130 whether to operate the secure digital security system 135 as a storage device and/or as a security device, as discussed further herein. Based on these instructions, the settings management module 310 may enable or disable security features of the secure digital security system 135. In some embodiments, the settings management module 310 supports remote management of the secure digital security system 135. More particularly, the settings management module 310 may allow an Information Technology (IT) administrator or other person with administrative privileges to remotely manage settings of the secure digital security system 135. The settings management module 310 may further allow the secure digital security system 135 to report ongoing threats to IT administrators or others with administrative privileges.

The virtualized file management module 315 may include hardware, software, and/or firmware operative to receive a streaming virtual file from the traffic virtualization security system 130. In some embodiments, the virtualized file management module 315 receives virtual files that represent intercepted network traffic from the security system interface module 225. As discussed herein, these virtual files may be streamed from the security system interface module 225. The virtualized file management module 315 may further include cryptographic protocols to decrypt portions of a virtual file if needed. The virtualized file management module 315 may provide portions of a virtual file to the other modules of the secure digital security system 135 so that the other modules can screen the portions of the virtual file for compliance with the security policies in the security policy management module 330, as discussed further herein.

The outgoing traffic identification module 320 may include hardware, software, and/or firmware operative to identify outgoing network traffic in a virtual file. More specifically, the outgoing traffic identification module 320 may screen a virtual file for the presence or the absence of outgoing network traffic that has been intercepted by the traffic virtualization security system 130. In some embodiments, the outgoing traffic identification module 320 screens headers and/or other information in the virtual file to identify whether portions of the virtual file correspond to outgoing network traffic. The outgoing traffic identification module 320 may provide the portions of the virtual file identified to correspond to outgoing network traffic to the other modules of the secure digital security system 135.

The incoming traffic identification module 325 may include hardware, software, and/or firmware operative to identify incoming network traffic in a virtual file. More particularly, the incoming traffic identification module 325 screen a virtual file for the presence or the absence of incoming network traffic that has been intercepted by the traffic virtualization security system 130. In some embodiments, the incoming traffic identification module 325 screens headers and/or other information in the virtual file to identify whether portions of the virtual file correspond to incoming network traffic. The incoming traffic identification module 325 may provide the portions of the virtual file identified to correspond to incoming network traffic to the other modules of the secure digital security system 135.

The security policy management module 330 may include hardware, software, and/or firmware operative to maintain security policies for the secure digital security system 135. The security policies may include security libraries that address known threats, zero-day attacks, provide intrusion detection, and/or provide protection from external threats. In some embodiments, the security policies include Firewall and VPN features—including stateful and stateless firewalls, Network Address Translation (NAT), packet filtering and manipulation, Denial of Service (DOS) and/or Distributed DOS (DDOS) protection, Netfilter features, the ability to isolate user mobile devices from the interne and run VPN program on the device, etc.

In various embodiments, the security policies include web accelerator and bandwidth/cache management based on protocols, such as Squid. The security policies may further include Intrusion Detection Systems (IDS) and/or Intrusion Protection Systems (IPS), such as IDS/IPS systems based on Snort, an open source network intrusion prevention and detection system utilizing a rule-driven language, which combines the benefits of signature, protocol- and anomaly-based inspections.

The security policies may further include antivirus and antispyware based on ClamAV; additional AV and AS engines, e.g., McAfee, Kaspersky, Pandamay, may be offered for additional subscription fees. The security policies may also include malicious content detection features, e.g., on the fly heuristics that perform content analysis to detect malicious content before having signatures. The malicious content detection features may be based on a rule base and updated rules and may include content dependent scanning.

In various embodiments, the security policies may further include URL Categorization Filtering. URL Categorization Filtering may be based on a commercial engine, such as Surfcontrol, Smart Filters or Websense. This may provide numerous categories of URLs such as gambling, adult content, news, webmail, etc. The security policies may apply different security policies based on the URL category, e.g., higher restriction and heuristics for Gambling or Adult content web sites, etc.

The outgoing traffic access determination module 335 may determine whether specific outgoing traffic is to be allowed access to the computer network 115 based on the security policies in the security policy management module 330. In various embodiments, the outgoing traffic access determination module 335 receives portions of the virtual file identified to correspond to outgoing network traffic from the outgoing traffic identification module 320. The outgoing traffic access determination module 335 may further evaluate whether the identified portions are to be allowed or to be denied access to the computer network 115.

The incoming traffic access determination module 340 may determine whether specific incoming traffic is to be allowed access to portions of the host device other than the network access module 125 and the traffic virtualization security system 130. In some embodiments, the incoming traffic access determination module 340 receives portions of the virtual file identified to correspond to incoming network traffic from the incoming traffic identification module 325. The incoming traffic access determination module 340 may further evaluate whether the identified portions are to be allowed or to be denied access to portions of the host device other than the network access module 125 and the traffic virtualization security system 130.

The instruction providing module 345 provides instructions to allow or to deny outgoing and/or incoming network traffic to the traffic virtualization security system 130. As discussed further herein, the traffic virtualization security system 130 may allow or deny the outgoing network traffic and/or the incoming network traffic based on the instructions.

Figure 4:
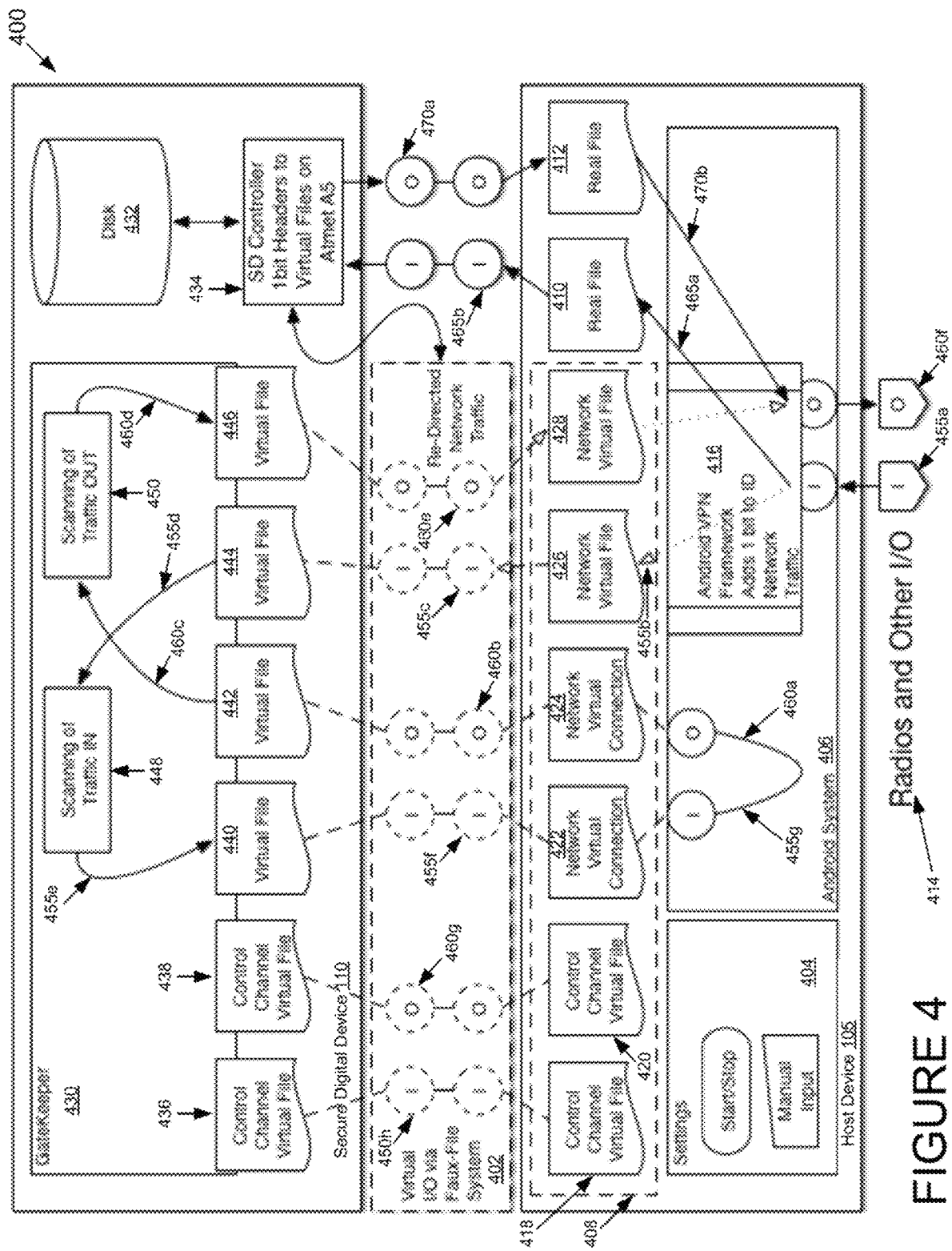
FIG. 4 is a diagram showing an example of a host device and a secure digital device, according to some embodiments.

FIG. 4 is a diagram 400 showing an example of a host device 105 and a secure digital device 110 coupled to one another with a virtualized file interface 402, according to some embodiments. The host device 105 may include a settings module 404, an Android system module 406, a traffic virtualization module 408, a first non-virtual file 410, a second non-virtual file 412, and network interface module 414. The settings module 404 may manage security settings (e.g., starting/stopping security functions, facilitating manual input and/or overrides of security functions) of the host device 105.

The Android system module 406 may include networked applications and/or processes on the host device 105. In various embodiments, the Android system module 406 includes applications and/or processes that provide outgoing network traffic to the network interface module 414 and/or receive incoming network traffic from the network interface module 414. The Android system module 406 may further include a virtualization framework 416. Using the techniques described herein, the virtualization framework 416 may incorporate network traffic into virtual files. The virtualization framework 416 may further add headers to specific network traffic to identify the network traffic as such. As discussed further herein, the virtualization framework 416 may also provide data for storage in the disk module 432 to the first non-virtual file 410 and the second non-virtual file 412 without incorporating the data into a virtual file.

The traffic virtualization module 408 may include virtual files and/or virtualized file interfaces. In the example of FIG. 4, the traffic virtualization module 408 includes a first control channel virtual file 418, a second control channel virtual file 420, a first network virtual connection 422, a second network virtual file 424, a first network virtual file 426, and a second network virtual file 428. The first control channel virtual file 418, the second control channel virtual file 420, the first network virtual connection 422, the second network virtual file 424, the first network virtual file 426, and the second network virtual file 428 may allow virtual files to be provided from the Android system module 406 to the virtualized file interface 402.

The secure digital device 110 may include a gatekeeper module 430, a disk module 432, and a controller module 434. The gatekeeper module 430 may be configured to receive virtual files containing network traffic from the host device 105, evaluate the network traffic in these virtual files for compliance with a security policy, and provide the host device 105 instructions whether to allow or to deny the network traffic. The gatekeeper module 430 may include a first control channel virtual file 436, a second control channel virtual file 438, a first virtual file 440, a second virtual file 442, a third virtual file 444, and a fourth virtual file 446. The first control channel virtual file 436, the second control channel virtual file 438, the first virtual file 440, the second virtual file 442, the third virtual file 444, and the fourth virtual file 446 may receive virtual files from the host device 105 through the virtualized file interface 402.

The gatekeeper module 430 may further include an incoming traffic access determination module 448 and an outgoing traffic access determination module 450. The incoming traffic access determination module 448 and the outgoing traffic access determination module 450 may allow network traffic to be evaluated in accordance with security policies and may provide instructions to allow or to deny the network traffic based on the evaluations.

The disk module 432 may include storage and/or memory for storing data. In various embodiments, the disk module 432 receives data from the host device 105. The data need not be virtualized and, instead, may be provided to the disk module 432 using a non-virtualized file interface. The disk module 432 may further store the data. The controller module 434 may be configured to receive data from the first non-virtual file 410 and provide the data to the disk module 432. In various embodiments, the controller module 434 provides data from the disk module 432 to the second non-virtual file 412.

The virtualized file interface 402 may couple the host device 105 to the secure digital device 110. In various embodiments, the virtualized file interface 402 facilitates transfer of virtual files between the host device 105 and the secure digital device 110. The virtualized file interface 402 may include one or more virtual file paths that allow virtual files including network traffic to be transferred between the host device 105 and the secure digital device 110, as discussed further herein.

In various embodiments, the host system 105, the secure digital device 110, and the virtualized file interface 402 support one or more traffic paths that allow network traffic to be routed to the gatekeeper module 430 through the virtualized file interface 402, and allow storage traffic (e.g., traffic associated with data to be stored on the secure digital device 110) to be routed directly to the disk module 432 without having to be virtualized.

For example, the host system 105, the secure digital device 110, and the virtualized file interface 402 may support an incoming network traffic path 455. At a first branch 455a, incoming network traffic is received at the network interface module 414 and provided to the virtualization framework 416. At a second branch 455b, the virtualization framework 416 may identify the incoming network traffic as network traffic, incorporate the incoming network traffic into the first network virtual file 426, and provide the first network virtual file 426 to the virtualized file interface 402. At a third branch 455c, the first network virtual file 426 is streamed to the secure digital device 110 using the virtualized file interface 402. The third virtual file 444 may be created at the secure digital device 110 using the information in the first network virtual file 426. At a fourth branch 455d, the third virtual file 444 is provided to the incoming traffic access determination module 448 for evaluation in accordance with a security policy. At a fifth branch 455e, instructions to allow or to deny the incoming network traffic are provided from the incoming traffic access determination module 448 and are incorporated into the first virtual file 440. At a sixth branch 455f, the first virtual file 440 is streamed from the secure digital device 110 to the host device 105 through the virtualized file interface 402. The first network virtual connection 422 may receive the instructions as part of a streamed virtual file. At a seventh branch 455g, the incoming network traffic is allowed or denied by the Android system module 406. At an eighth branch 455h, control data relating to the incoming network traffic may be passed through the virtualized file interface.

As another example, the host system 105, the secure digital device 110, and the virtualized file interface 402 may support an outgoing network traffic path 460. At a first branch 460a, the outgoing network traffic is generated at the Android system module 406. The outgoing network traffic may be provided to the second network virtual file 424. The outgoing network traffic may be incorporated into a virtual file. At a second branch 460b, the virtual file may be streamed from the host device 105 to the secure digital device 110 through the virtualized file interface 402. The second virtual file 442 may be created at the secure digital device 110 using the information in the second network virtual file 424. At a third branch 460c, the second virtual file 442 is provided to the outgoing traffic access determination module 450 for evaluation in accordance with the security policy. At a fourth branch 460d, instructions to allow or to deny the outgoing network traffic are provided from the outgoing traffic access determination module 450 and are incorporated into the fourth virtual file 446. At a fifth branch 460e, instructions to allow or to deny the outgoing network traffic are streamed from the secure digital device 110 to the host device 105 over the virtualized file interface 402. The instructions may be incorporated into the second network virtual file 428. Outgoing network traffic that is denied need not access the network interface module 414. However, outgoing network traffic that is allowed may be provided to the network over the network interface module 414. As a result, at a sixth branch 460f, the outgoing network traffic may be provided from the network interface module 414. At a seventh branch 460g, control data relating to the outgoing network traffic may be passed through the virtualized file interface.

As yet another example, the host system 105, the secure digital device 110, and the virtualized file interface 402 may support an incoming storage traffic path 465. At a first branch 465a, the first non-virtual file 410 is provided by the virtualization framework 416. The first non-virtual file 410 may include storage traffic, such as data that the host device 105 is attempting to store in the disk module 432. At a second branch 465b, the first non-virtual file is provided to the controller module 434 over a file system interface that couples the host device 105 to the secure digital device 110. The controller module 434 may store the storage traffic on the disk module 432 using disk write or other procedures.

As yet another example, the host system 105, the secure digital device 110, and the virtualized file interface 402 may support an outgoing storage traffic path 470. In various embodiments, the disk module 432 may provide the controller module 434 with outgoing storage traffic such as data being read or transferred from the disk module 432. In a first branch 470a, the controller module 434 may provide the outgoing storage traffic to the host device 105, which in turn may store the outgoing storage traffic as the second non-virtual file 412. At a second branch 470b, the virtualization framework 416 may provide the outgoing storage traffic to the network interface module 414.

FIG. 5 is a diagram 500 showing an example of a host device 105 and a secure digital device 110, according to some embodiments. The host device 105 is coupled to the secure digital device 110 using an SD interface 505. The secure digital device 110 includes Random Access Memory 510, a processing module 515, a non-volatile storage I/O module 520, non-volatile storage 525, and an SD client interface 535. The processing module 515 includes an ARM Cortex A processor 530, and the secure digital security system 135. The host device may be coupled to the SD client interface 535 with the SD interface 505. The SD client interface 535 may be coupled to the processing module 515. Further, the processing module 515 may be coupled to the random access memory 510 and to the non-volatile storage I/O module 520. The non-volatile storage I/O module 520 may be coupled to the non-volatile storage 525.

In various embodiments, the host device 105 and the secure digital device 110 may support a network traffic path where network traffic is redirected to the secure digital security system 135 for evaluation in accordance with a security policy stored in the non-volatile storage 525. More specifically, in these embodiments, a security policy may be stored in the non-volatile storage 525. The security policy may be protected by security protocols, such as cryptography protocols, that secure the security policy from unauthorized access outside the secure digital device 110. The network traffic may be provided from the host device 105 through the SD interface 505 and the SD client interface 535 to the secure digital security system 135. The secure digital security system 135 may evaluate the network traffic in accordance with the security policy stored in the non-volatile storage 525.

Additionally, in some embodiments, the host device 105 and the secure digital device 110 may support a storage traffic path that allows storage traffic to be stored in the random access memory 510. More particularly, storage traffic may be provided by the host device 105 through the SD interface 505 and the SD client interface 535 to the secure digital security system 135. The storage traffic may further be provided from the secure digital security system 135 to the random access memory 510 for storage thereon.

FIG. 6 is a diagram 600 showing an example of a host device 105 and a secure digital device 110, according to some application-level redirect embodiments. As shown in FIG. 6, the host device 105 may include a security management console 605, Android Applications (APPs) 610, an Android Service Framework to Network Redirect module 615, Application Framework modules 620, an SD Ethernet Device Driver 625, an SD Storage Device Driver 630, a host device kernel 635, and network interfaces (shown as a Fourth Generation (4G) network interface 640, a WiFi network interface 645, and a Bluetooth® network interface 650).

The secure digital device 110 may include a firewall module 655, an IDS/IPS module, other security modules 660, a secure digital device kernel 665, an SD Ethernet Device Driver 670, an SD Storage Device Driver 675, and other device drivers 680. The host device 105 and the secure digital device 110 may be connected to one another over a secure encrypted connection.

In various embodiments, the Android Service Framework to Network Redirect module 615 intercepts network traffic 685 from one or more of the Android APPs 610, the Application Framework modules 620, the host device kernel 635, the Fourth Generation (4G) network interface 640, the WiFi network interface 645, and the Bluetooth® network interface 650. The Android Service Framework to Network Redirect module 615 may further incorporate the network traffic into a virtual file. The Android Service Framework to Network Redirect module 615 may further provide the virtual file to the secure digital device kernel 665 using a secure connection 695. The secure digital device 110 may evaluate the network traffic in accordance with a security policy and may return instructions to allow or to deny the network traffic over the secure connection 695. The Android Service Framework to Network Redirect module 615 may allow or deny the network traffic based on these instructions. In some embodiments, the Android Service Framework to Network Redirect module 615 provides the traffic to one or more of the Fourth Generation (4G) network interface 640, the WiFi network interface 645, and the Bluetooth® network interface 650 using an outgoing network path.

FIG. 7 is a diagram 700 showing an example of a host device 105 and a secure digital device 110, according to some root-level redirect embodiments. The host device 105 may include a security management console 705, Android Applications (APPs) 710, Android Application Frameworks 715, a host device kernel module 720, an SD Ethernet Device Driver 725, an SD Storage Device Driver 730, other device drivers 735, and network interfaces (shown as a Fourth Generation (4G) network interface 740, a WiFi network interface 745, and a Bluetooth® network interface 750).

The secure digital device 110 may include a firewall module 755, a snort module 760, other security modules 765, a secure digital device kernel 770, an SD Ethernet Device Driver 775, an SD Storage Device Driver 780, and other device drivers 785. The host device kernel module 720 and the secure digital device kernel 770 may be connected to one another through an SD interface 790.

In various embodiments, the host device kernel module 720 intercepts network traffic 796 from one or more of the Android APPs 710, the Application Framework modules 715, the host device kernel 720, the Fourth Generation (4G) network interface 740, the WiFi network interface 745, and the Bluetooth® network interface 750. The host device kernel module 720 further incorporate the network traffic into a virtual file. The host device kernel module 720 may further provide the virtual file to the secure digital device kernel 770 using a secure connection 795 over the SD Interface 790. The secure digital device 110 may evaluate the network traffic in accordance with a security policy and may return instructions to allow or to deny the network traffic over the secure connection 795. The host device kernel module 720 may allow or deny the network traffic based on these instructions. In some embodiments, the host device kernel module 720 provides the traffic to one or more of the Fourth Generation (4G) network interface 740, the WiFi network interface 745, and the Bluetooth® network interface 750 using an outgoing network path.

Figure 8:
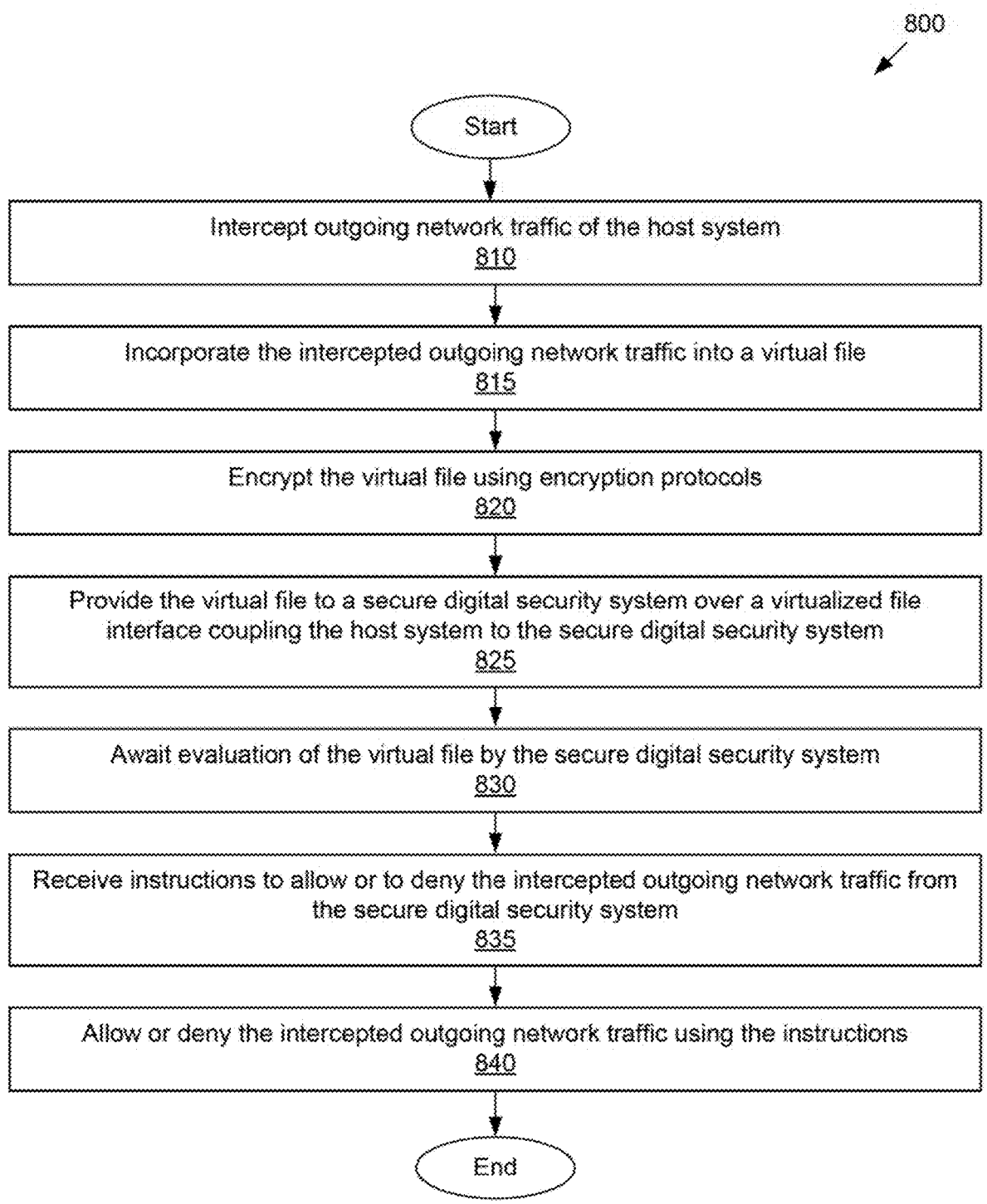
FIG. 8 is a flowchart of an example of a method for securing outgoing traffic, according to some embodiments.

FIG. 8 is a flowchart of an example of a method 800 for securing outgoing traffic, according to some embodiments. The method 800 is discussed in conjunction with the traffic virtualization security system 130.

At step 810, the outgoing traffic interception module 205 intercepts outgoing network traffic of the host device 105. More specifically, the outgoing traffic interception module 205 may redirect specific outgoing network traffic to relevant network stacks and/or other portions of the traffic virtualization security system 130 so that the specific outgoing network traffic can be sent to the secure digital security system 135, as discussed further herein. The outgoing traffic interception module 205 may monitor application-level and/or root-level processes for outgoing network traffic, such as requests for network resources and network access attempts. In application-level redirect embodiments, the outgoing traffic interception module 205 monitors network calls of applications and/or processes of the host device 105. In root-level embodiments, the outgoing traffic interception module 205 monitors system- and/or kernel-level processes for the presence or the absence of outgoing network traffic.

At step 815, the traffic virtualization module 215 incorporates the intercepted outgoing network traffic into a virtual file. For instance, the traffic virtualization module 215 may use VPN tables of the operating system of the host device 105 to create a virtual file that incorporates the outgoing network files therein. The traffic virtualization module 215 may further insert headers etc. into packets of the virtual file to identify portions of the virtual file that include representations of the outgoing network traffic.

At step 820, the virtualized traffic encryption module 220 encrypts the virtual file using one or more encryption protocols. As discussed further herein, the encryption protocols may be consistent with the cryptography techniques used by the secure digital security system 135.

At step 825, the security system interface module 225 provides the virtual file to the secure digital security system 135 over a virtualized file interface coupling the host device 105 to the secure digital security system 135. In various embodiments, the security system interface module 225 streams the virtual file to the secure digital security system 135 over a virtualized file interface (e.g., a virtual I/O faux-file system). In application-level embodiments, the virtualized file interface may include a secure and encrypted coupling between the network service redirection frameworks of the host device 105 and a kernel of the secure digital device 110. In root-level redirect embodiments, the virtualized file interface may include a secure and encrypted coupling between a portion of the kernel of the host device 105 and a portion of the kernel of the secure digital device 110.

At step 830, the traffic virtualization security system 130 awaits evaluation of the virtual file by the secure digital security system 135. During the relevant waiting period, the traffic virtualization security system 130 may perform other actions, such as continuing to monitor network traffic, etc.

At step 835, the security system interface module 225 receives instructions to allow or to deny the intercepted outgoing network traffic from the secure digital security system 135. The instructions to allow or to deny the outgoing network traffic may arrive over the virtualized file interface. The security system interface module 225 may provide the instructions to allow or to deny the outgoing traffic to the outgoing traffic access management module 230.

At step 840, the outgoing traffic access management module 230 allows or denies the intercepted outgoing traffic using the instructions. In application-level redirect embodiments, the outgoing traffic access management module 230 allows and/or denies access to the computer network 115 by specific network calls of applications and/or processes of the host device 105. In root-level redirect embodiments, the outgoing traffic access management module 230 allows and/or denies access to the computer network 115 by system- and/or kernel-processes of the network access module 125.

Figure 9:
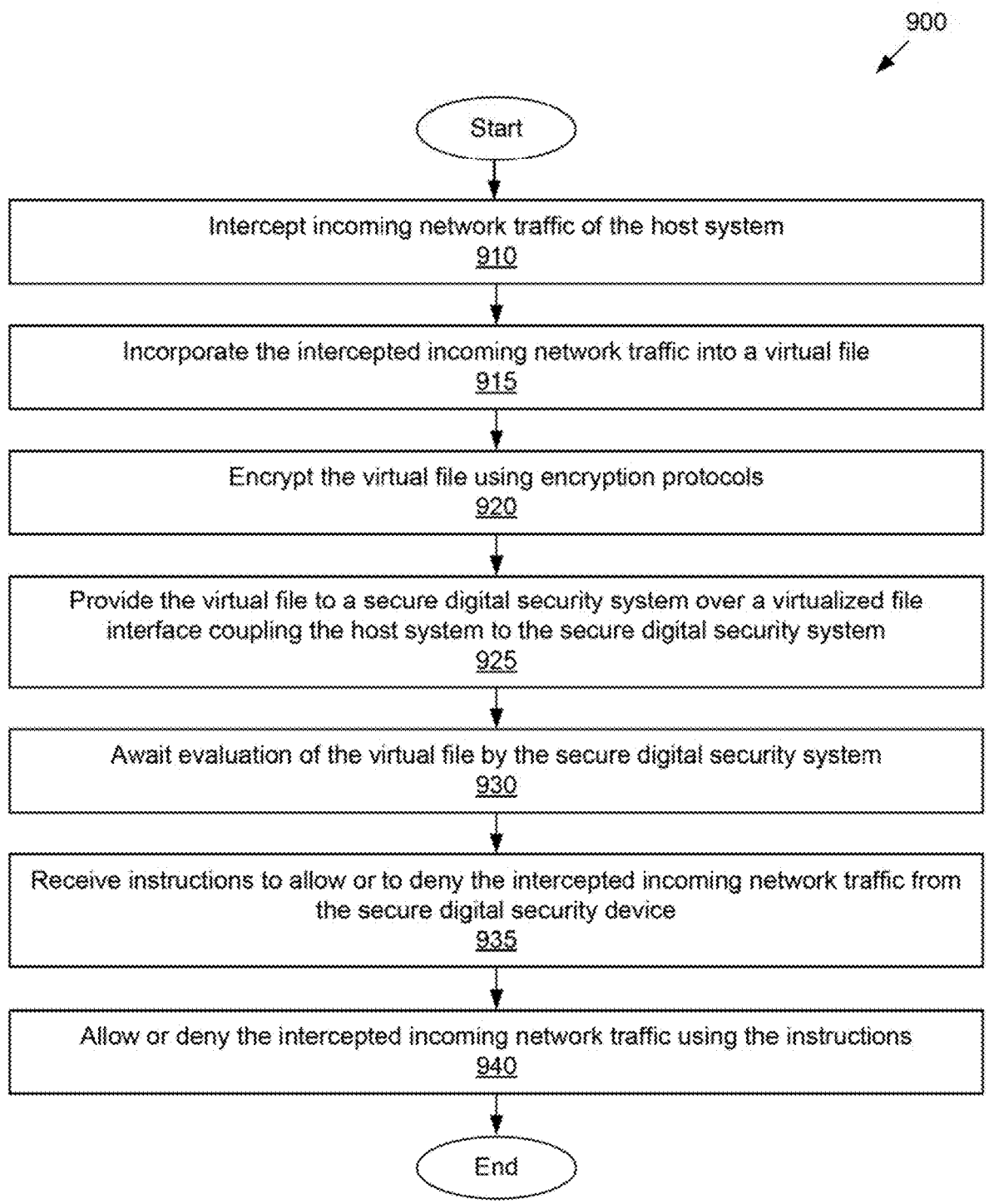
FIG. 9 is a flowchart of an example of a method for securing incoming traffic, according to some embodiments.

FIG. 9 is a flowchart of an example of a method 900 for securing incoming traffic, according to some embodiments. The method 900 is discussed in conjunction with the traffic virtualization security system 130.

At step 910, the incoming traffic interception module 210 intercepts incoming network traffic of the host device 105. More specifically, the incoming traffic interception module 210 may redirect specific incoming network traffic to relevant network stacks and/or other portions of the traffic virtualization security system 130 so that the specific incoming network traffic can be sent to the secure digital security system 135, as discussed further herein. In various embodiments, the incoming traffic interception module 210 may monitor application-level and/or root-level processes for incoming network traffic, networked resources and data arriving at the network access module 125. In root-level embodiments, for instance, the incoming traffic interception module 210 monitors system- and/or kernel-level processes for the presence or the absence of incoming network traffic.

At step 915, the traffic virtualization module 215 incorporates the intercepted incoming network traffic into a virtual file. For instance, the traffic virtualization module 215 may use VPN tables of the operating system of the host device 105 to create a virtual file that incorporates the incoming network files therein. The traffic virtualization module 215 may further insert headers etc. into packets of the virtual file to identify portions of the virtual file that include representations of the incoming network traffic.

At step 920, the virtualized traffic encryption module 220 encrypts the virtual file using one or more encryption protocols. As discussed further herein, the encryption protocols may be consistent with the cryptography techniques used by the secure digital security system 135.

At step 925, the security system interface module 225 provides the virtual file to the secure digital security system 135 over a virtualized file interface coupling the host device 105 to the secure digital security system 135. In some embodiments, the security system interface module 225 streams the virtual file to the secure digital security system 135 over a virtualized file interface (e.g., a virtual I/O faux-file system). In application-level embodiments, the virtualized file interface may include a secure and encrypted coupling between the network service redirection frameworks of the host device 105 and a kernel of the secure digital device 110. In root-level redirect embodiments, the virtualized file interface may include a secure and encrypted coupling between a portion of the kernel of the host device 105 and a portion of the kernel of the secure digital device 110.

At step 930, the traffic virtualization security system 130 awaits evaluation of the virtual file by the secure digital security system 135. During the relevant waiting period, the traffic virtualization security system 130 may perform other actions, such as continuing to monitor network traffic, etc.

At step 935, the security system interface module 225 receives instructions to allow or to deny the intercepted incoming network traffic from the secure digital security system 135. The instructions to allow or to deny the outgoing network traffic may arrive over the virtualized file interface. The security system interface module 225 may provide the instructions to allow or to deny the incoming traffic to the incoming traffic access management module 235.

At step 940, the incoming traffic access management module 235 allows or denies the intercepted incoming traffic using the instructions. In root-level redirect embodiments, the incoming traffic access management module 240 allows and/or denies incoming network traffic access to portions of the host device other than the network access module 125 and the traffic virtualization security system 130. For instance, the incoming traffic access management module 240 may limit incoming network traffic access rights outside the NIC of the host device 105.

Figure 10:
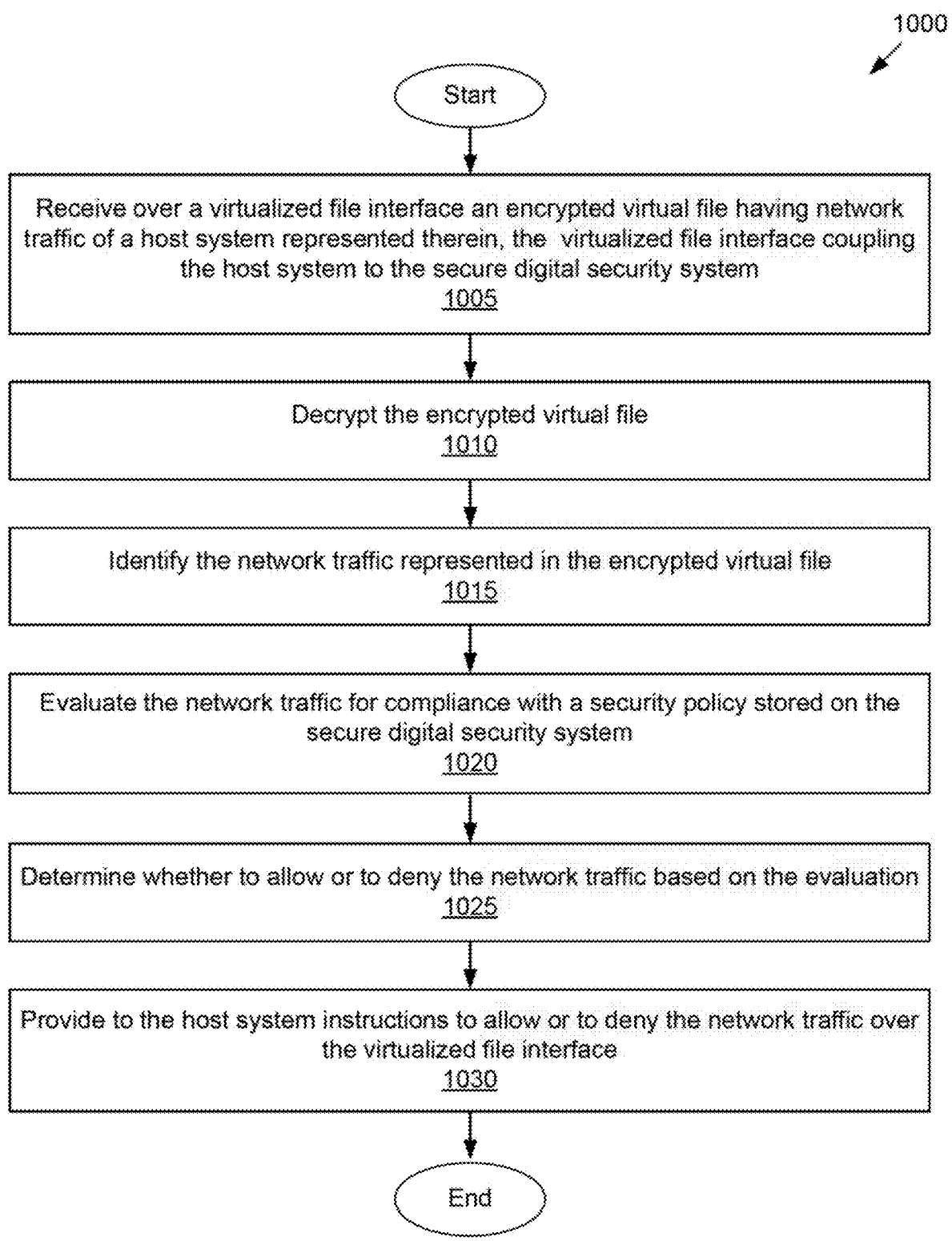
FIG. 10. is a flowchart of an example of a method for providing instructions to allow or to deny network traffic in a virtual file, according to some embodiments.

FIG. 10. is a flowchart of an example of a method 1000 for providing instructions to allow or to deny network traffic in a virtual file, according to some embodiments. The method 1000 is discussed in conjunction with the secure digital security system 135.

At step 1005, the virtualized file management module 315 receives over a virtualized file interface an encrypted virtual file having network traffic of the host device 105 represented therein. The virtualized file interface may couple the host device 105 to the secure digital security system 135. The encrypted virtual file may have represented therein outgoing network traffic or incoming network traffic. The outgoing network traffic and/or incoming network traffic may have been captured by application-level redirect embodiments or root-level redirect embodiments of the traffic virtualization security system 130. As noted herein, in some embodiments, the virtualized file management module 315 or other component of the secure digital security system 135 may look at the header to differentiate between an encrypted virtual file containing network traffic for evaluation and a real file write request or a real file read request.

At step 1010, the virtualized file management module 315 decrypts the virtual file. The virtualized file management module 315 may use similar cryptography protocols as the virtualized traffic encryption module 220, as discussed further herein.

At step 1015, the outgoing traffic identification module 320 or the incoming traffic identification module 325 identifies the network traffic that is represented in the encrypted virtual file. More specifically, the outgoing traffic identification module 320 may screen headers and/or other information in the virtual file to identify whether portions of the virtual file correspond to outgoing network traffic. The outgoing traffic identification module 320 may provide the portions of the virtual file identified to correspond to outgoing network traffic to the other modules of the secure digital security system 135. Further, the incoming traffic identification module 325 may screen headers and/or other information in the virtual file to identify whether portions of the virtual file correspond to incoming network traffic. The incoming traffic identification module 325 may provide the portions of the virtual file identified to correspond to incoming network traffic to the other modules of the secure digital security system 135.

At step 1020, the security policy management module 330 evaluates the network traffic for compliance with a security policy stored on the secure digital security system.

At step 1025, the outgoing traffic access determination module 335 or the incoming traffic access determination module 340 determines whether to allow or to deny the network traffic based on the evaluation. More specifically, the outgoing traffic access determination module 335 may receive portions of the virtual file identified to correspond to outgoing network traffic from the outgoing traffic identification module 320. The outgoing traffic access determination module 335 may further evaluate whether the identified portions are to be allowed or to be denied access to the computer network 115. Further, the incoming traffic access determination module 340 may receive portions of the virtual file identified to correspond to incoming network traffic from the incoming traffic identification module 325. The incoming traffic access determination module 340 may further evaluate whether the identified portions are to be allowed or to be denied access to portions of the host device other than the network access module 125 and the traffic virtualization security system 130.

At step 1030, the instruction providing module 345 provides to the host device 105 instructions to allow or to deny the network traffic over the virtualized file interface. The instruction providing module 345 may provide the instructions in any manner compatible with the virtualized file interface.

Figure 11:
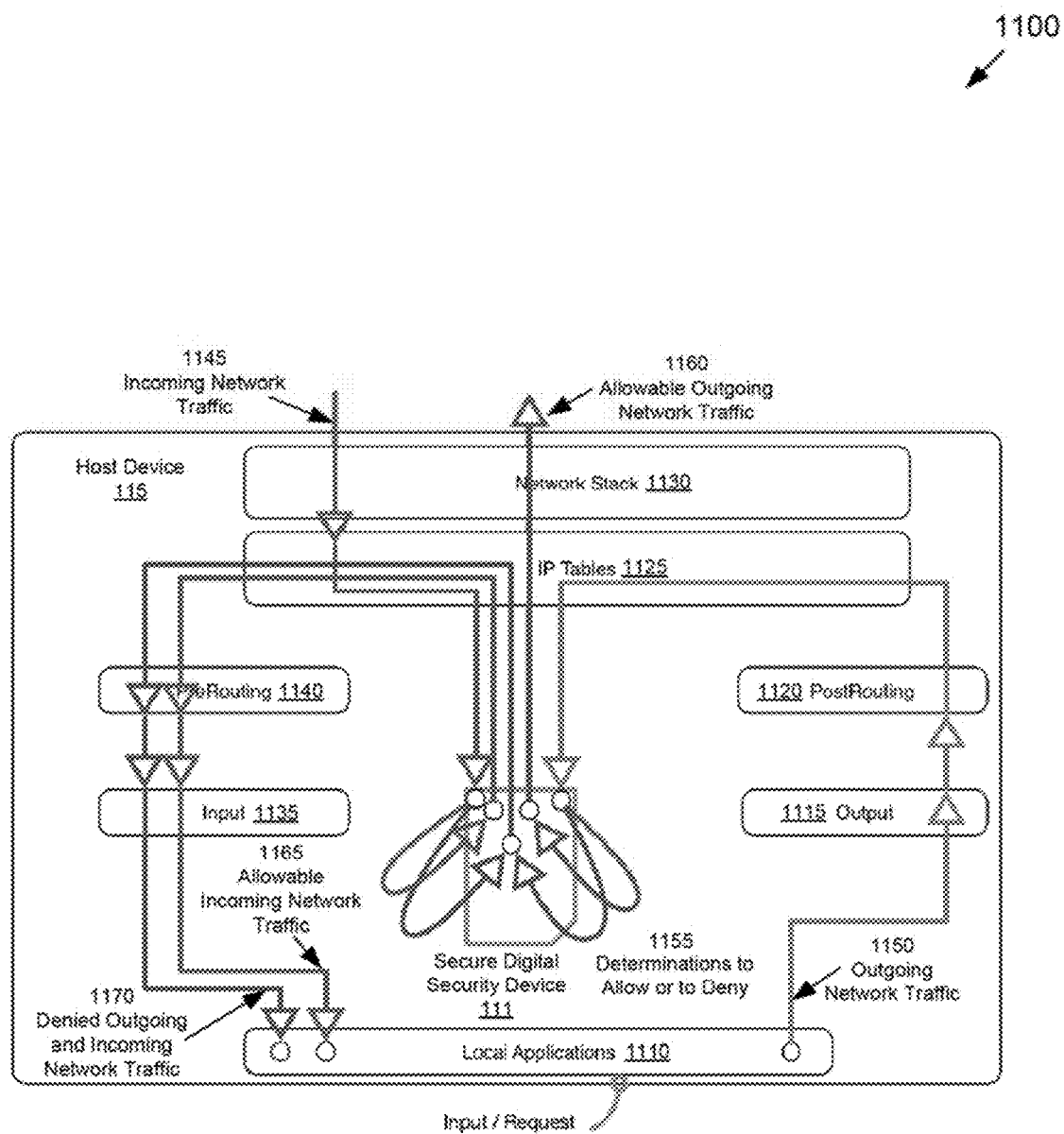
FIG. 11 is a diagram of an example of signal flow that occurs when securing outgoing traffic and incoming traffic, according to some embodiments.

FIG. 11 is a diagram 1100 of an example of signal flow that occurs when securing outgoing traffic and incoming traffic, according to some embodiments. The diagram 1100 includes the host device 105 and the secure digital security device 111. The host device includes local applications 1110, an output layer 1115, a post-routing layer 1120, IP tables 1125, a network stack 1130, an input layer 1135, and a prerouting layer 1140.

The diagram 1100 also shows an incoming network traffic routing path 1145, an outgoing network traffic routing path 1150, an allowable outgoing network traffic routing path 1160, an allowable incoming network traffic routing path 1165, and a denied outgoing network traffic and incoming network traffic routing path 1170.

The incoming network traffic routing path 1145 shows incoming network traffic being received at the network stack 1130, and provided to the IP tables 1125. The IP tables 1125 may provide a virtual file representing the incoming network traffic to the secure digital security system 135, where there is a determination whether to allow or to deny the incoming network traffic. Allowable incoming network traffic may be provided along the incoming network traffic routing path 1170, i.e., to the IP tables 1125 and the network stack 1130, where it is provided to the local applications 1110. Denied incoming network traffic and/or a message regarding the denial may be provided to the outgoing network traffic and incoming network traffic routing path 1170, i.e., through the prerouting layer 1140 and the input layer 1135 to the local applications 1110.

The outgoing network traffic routing path 1150 shows outgoing network traffic initiating at the local applications 1110, and being provided to the output layer 1115 and the post-routing layer 1120 to the IP tables 1125. The IP tables 1125 may provide a virtual file representing the outgoing network traffic to the secure digital security system 135, where there is a determination to allow or to deny the outgoing network traffic. Allowable outgoing network traffic may be provided along the allowable outgoing network traffic routing path 1160, i.e., to the IP tables 1125 and to the network stack 1130. Denied outgoing network traffic and/or a message regarding the denial may be provided to the outgoing network traffic and incoming network traffic routing path 1170, i.e., through the prerouting layer 1140 and the input layer 1135 to the local applications 1110.

Figure 12:
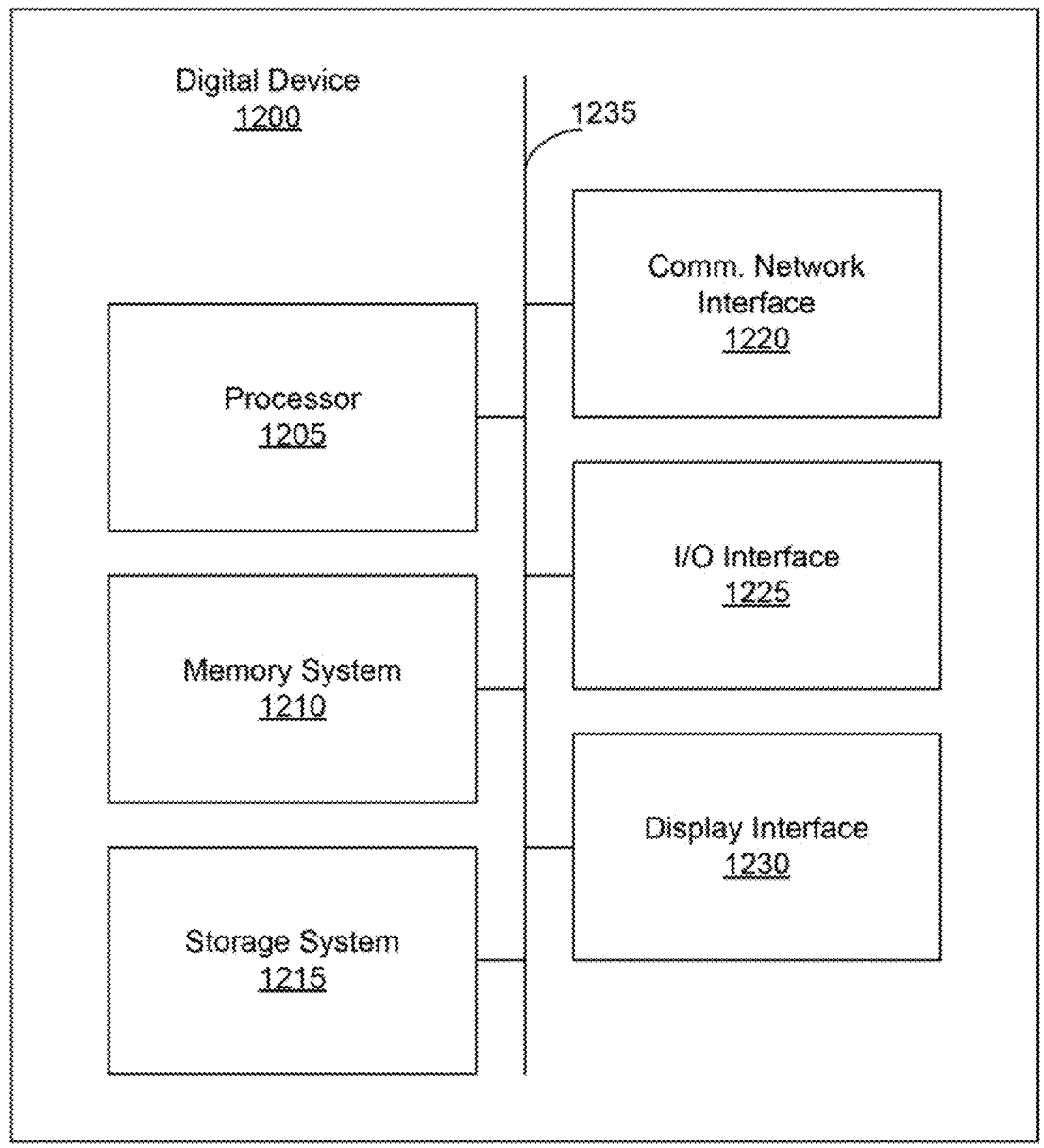
FIG. 12 shows an example of a digital device, according to some embodiments.

FIG. 12 depicts an example of a digital device 1200, according to some embodiments. The digital device 1200 comprises a processor 1205, a memory system 1210, a storage system 1215, a communication network interface 1220, an input/output (I/O) interface 1225, a display interface 1230, and a bus 1235. The bus 1235 may be communicatively coupled to the processor 1205, the memory system 1210, the storage system 1215, the communication network interface 1220, the I/O interface 1225, and the display interface 1230.

In some embodiments, the processor 1205 comprises circuitry or any processor capable of processing the executable instructions. The memory system 1210 comprises any memory configured to store data. Some examples of the memory system 1210 are storage devices, such as RAM or ROM. The memory system 1210 may comprise the RAM cache. In various embodiments, data is stored within the memory system 1210. The data within the memory system 1210 may be cleared or ultimately transferred to the storage system 1215.

The storage system 1215 comprises any storage configured to retrieve and store data. Some examples of the storage system 1215 are flash drives, hard drives, optical drives, and/or magnetic tape. In some embodiments, the digital device 1200 includes a memory system 1210 in the form of RAM and a storage system 1215 in the form of flash data. Both the memory system 1210 and the storage system 1215 comprise computer readable media which may store instructions or programs that are executable by a computer processor including the processor 1205.

The communication network interface 1220 may be coupled to a data network. The communication network interface 1220 may support communication over an Ethernet connection, a serial connection, a parallel connection, or an ATA connection, for example. The communication network interface 1220 may also support wireless communication (e.g., 802.12 a/b/g/n, WiMAX, LTE, 4G, 3G, 2G). It will be apparent to those skilled in the art that the communication network interface 1220 may support many wired and wireless standards.

The optional input/output (I/O) interface 1225 is any device that receives input from the user and output data. The display interface 1230 is any device that may be configured to output graphics and data to a display. In one example, the display interface 1230 is a graphics adapter.

It will be appreciated by those skilled in the art that the hardware elements of the digital device 1200 are not limited to those depicted in FIG. 12. A digital device 1200 may comprise more or less hardware elements than those depicted. Further, hardware elements may share functionality and still be within various embodiments described herein. In one example, encoding and/or decoding may be performed by the processor 1205 and/or a co-processor located on a Graphics Processing Unit ("GPU").

The above-described functions and components may be comprised of instructions that are stored on a storage medium such as a computer readable medium. The instructions may be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with some embodiments. Those skilled in the art are familiar with instructions, processor(s), and storage medium.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment," "an embodiment," "some embodiments," "various embodiments," "certain embodiments," "other embodiments," "one series of embodiments," or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope be limited not by this detailed description, but rather by any claims that issue on an application based hereon. Accordingly, the disclosure of the embodiments is intended to be illustrative, but not limiting, of the scope, which is set forth in the following claims.

The invention claimed is:

1. A secure digital security system, comprising:
   a file management module configured to receive a transfer file from a host device over a virtual file interface configured to assist in transferring data at file transfer speeds between the host device and the secure digital security system, the transfer file containing a virtual file containing network traffic intercepted at the host device, the network traffic including one of incoming network traffic to the host device or outgoing network traffic from the host device;
   a security policy management module configured to evaluate the network traffic in the virtual file for compliance with a security policy;
   a traffic access determination module configured to generate a security indication whether to allow or to deny the network traffic in accordance with the evaluation; and
   a module configured to provide to the host device over the virtual file interface the security indication whether to allow or to deny the network traffic.

2. The secure digital security system of claim 1, wherein the virtual file comprises one or more encrypted virtual files.

3. The secure digital security system of claim 1, wherein the secure digital security system is incorporated into a Secure Digital (SD) card coupled to the host device.

4. The secure digital security system of claim 1, wherein the host device comprises a portable electronic device.

5. The secure digital security system of claim 1, wherein the virtual file includes one or more data packets.

6. A method in a secure digital security system, the secure digital security system including at least one security engine, the method comprising:
   receiving a transfer file from a host device over a virtual file interface configured to transfer data at file transfer speeds, the transfer file containing a virtual file containing network traffic intercepted at the host device, the network traffic including one of incoming network traffic to the host device or outgoing network traffic from the host device;
   using the at least one security engine to evaluate the network traffic in the virtual file for compliance with a security policy;
   generating a security indication whether to allow or to deny the network traffic in accordance with the evaluation; and
   providing to the host device the security indication whether to allow or to deny the network traffic.

7. The method of claim 6, wherein the virtual file comprises one or more encrypted virtual files.

8. The method of claim 6, wherein the secure digital security system is incorporated into a Secure Digital (SD) card coupled to the host device.

9. The method of claim 6, wherein the host device comprises a portable electronic device.

10. The method of claim 6, wherein the virtual file includes one or more data packets.

11. A system comprising:
    a host device including:
       at least one processor;
       a virtual file interface configured to assist in transferring file data at file transfer speeds to a secure digital security system, the secure digital security system including a security engine configured to conduct a security process on network traffic; and
       memory storing computer instructions, the computer instructions configured to cause the at least one processor to:
          intercept network traffic, the intercepted network traffic including one of incoming network traffic to the host device or outgoing network traffic from the host device;
          package the intercepted network traffic as one or more virtual files containing the intercepted network traffic;

provide the one or more virtual files to the virtual file interface, the virtual file interface configured to assist in transferring the one or more virtual files as the file data at the file transfer speeds to the secure digital security system, the secure digital security system further configured to conduct the security process on the intercepted network traffic contained in the one or more virtual files and to generate a security indication indicating whether the intercepted network traffic is deemed safe according to the security process;

receive the security indication from the secure digital security system; and allow the system to process the intercepted network traffic when the security indication indicates that the intercepted network traffic is safe according to the security process;

the secure digital security system comprising:

a file management module configured to receive the one or more virtual files from the host device over the virtual file interface;

a security policy management module configured to evaluate the network traffic in the one or more virtual files for compliance with a security policy;

a traffic access determination module configured to generate the security indication whether to allow or to deny the network traffic in accordance with the evaluation; and a module configured to provide to the host device over the virtual file interface the security indication whether to allow or to deny the network traffic.

12. The system of claim 11, wherein the secure digital security system is a secure digital (SD) card.

13. The system of claim 11, wherein the computer instructions configured to cause the at least one processor to intercept the network traffic include computer instructions configured to cause the at least one processor to monitor application-level processes.

14. The system of claim 13, wherein the computer instructions configured to cause the at least one processor to monitor the application-level processes include computer instructions configured to cause the at least one processor to monitor for network calls from one or more applications.

15. The system of claim 11, wherein the computer instructions configured to cause the at least one processor to intercept the network traffic include computer instructions configured to cause the at least one processor to monitor root-level processes.

16. The system of claim 11, wherein the computer instructions configured to cause the at least one processor to package the intercepted network traffic as the one or more virtual files include computer instructions configured to cause the at least one processor to use virtual private network (VPN) tables to package the intercepted network traffic as the one or more virtual files.

17. The system of claim 11, wherein the one or more virtual files include a plurality of data packets.

18. The system of claim 11, wherein the computer instructions are further configured to cause the at least one processor to encrypt the one or more virtual files before the one or more virtual files are transferred to the secure digital security system.

19. A method comprising:

intercepting network traffic by a host device, the intercepted network traffic including one of incoming network traffic to the host device or outgoing network traffic from the host device, the host device including at least one processor and a virtual file interface configured to assist in transferring file data at file transfer speeds to a secure digital security system, the secure digital security system including a security engine configured to conduct a security process on network traffic;

packaging by the host device the intercepted network traffic as one or more virtual files containing the intercepted network traffic;

providing by the host device the one or more virtual files to the virtual file interface, the virtual file interface assisting in transferring the one or more virtual files as the file data at the file transfer speeds to the secure digital security system;

receiving by the secure digital security system the one or more virtual files from the host device over the virtual file interface;

evaluating by the secure digital security system the network traffic in the one or more virtual files for compliance with a security policy;

generating by the secure digital security system a security indication whether to allow or to deny the network traffic in accordance with the evaluation;

providing by the secure digital security system to the host device over the virtual file interface the security indication whether to allow or to deny the network traffic;

receiving by the host device the security indication from the secure digital security system; and processing by the host device the intercepted network traffic when the security indication indicates that the intercepted network traffic is safe according to the security process.

20. The method of claim 19, wherein the intercepting the network traffic includes monitoring application-level processes.

21. The method of claim 20, wherein the monitoring the application-level processes includes monitoring for network calls from one or more applications.

22. The method of claim 19, wherein the intercepting the network traffic includes monitoring root-level processes.

23. The method of claim 19, wherein the packaging the intercepted network traffic as the one or more virtual files includes using virtual private network (VPN) tables to package the intercepted network traffic as the one or more virtual files.

24. The method of claim 19, wherein the one or more virtual files include a plurality of data packets.

* * * * *